(12) United States Patent
Zhang et al.

(10) Patent No.: US 12,294,546 B2
(45) Date of Patent: May 6, 2025

(54) METHOD AND APPARATUS FOR DETERMINING INFORMATION, METHOD AND APPARATUS FOR DETERMINING CORRESPONDING RELATIONSHIP, DEVICE, AND STORAGE MEDIUM

(71) Applicant: ZTE CORPORATION, Shenzhen (CN)

(72) Inventors: Shujuan Zhang, Shenzhen (CN); Zhaohua Lu, Shenzhen (CN); Jianwei Wang, Shenzhen (CN); Bo Gao, Shenzhen (CN); Chuangxin Jiang, Shenzhen (CN); Zhen He, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 406 days.

(21) Appl. No.: 17/775,234

(22) PCT Filed: Nov. 6, 2020

(86) PCT No.: PCT/CN2020/127023
§ 371 (c)(1),
(2) Date: Aug. 25, 2022

(87) PCT Pub. No.: WO2021/088963
PCT Pub. Date: May 14, 2021

(65) Prior Publication Data
US 2023/0046074 A1    Feb. 16, 2023

(30) Foreign Application Priority Data
Nov. 7, 2019    (CN) .......................... 201911083769.3

(51) Int. Cl.
*H04L 5/00* (2006.01)
*H04W 24/04* (2009.01)
*H04W 72/04* (2023.01)

(52) U.S. Cl.
CPC .......... *H04L 5/0053* (2013.01); *H04L 5/0051* (2013.01); *H04W 24/04* (2013.01); *H04W 72/04* (2013.01)

(58) Field of Classification Search
CPC .... H04L 5/0051; H04L 5/0053; H04W 24/04; H04W 72/04
See application file for complete search history.

(56) References Cited

U.S. PATENT DOCUMENTS 10,826,758 B2 * 11/2020 Huang ................... H04B 7/088
2019/0319833 A1   10/2019 Nagaraja et al.
(Continued)

FOREIGN PATENT DOCUMENTS

CN    110324069 A    10/2019
CN    110351756 A    10/2019
(Continued)

OTHER PUBLICATIONS

Partial Supplementary European Search Report of Application No. 20883787.2, dated Mar. 1, 2024, 24 pages.
(Continued)

*Primary Examiner* — Alpus Hsu
(74) *Attorney, Agent, or Firm* — Morgan, Lewis & Bockius LLP

(57) ABSTRACT

Provided are a method and apparatus for determining information, a method and apparatus for determining corresponding relationship, a device, and a medium. The method for determining the corresponding relationship includes determining a first corresponding relationship according to at least one of signaling information or a predetermined rule.
(Continued)

Determine a first correspondence according to signaling information and/or a predetermined rule — S220

The first corresponding relationship includes at least one of the following: a corresponding relationship between N pieces of third information and M sets of beam failure recovery parameters or a corresponding relationship between a first-type frequency domain bandwidth group and a second-type frequency domain bandwidth group. N and M are each a positive integer greater than or equal to 1. A piece of third information includes at least one of the following: a control resource set (CORESET) group or a frequency domain bandwidth group.

19 Claims, 3 Drawing Sheets

(56) References Cited

U.S. PATENT DOCUMENTS

| | | | |
|---|---|---|---|
| 2020/0100154 A1* | 3/2020 | Cirik | H04B 7/088 |
| 2020/0350972 A1* | 11/2020 | Yi | H04L 1/12 |
| 2020/0351841 A1* | 11/2020 | Cirik | H04B 7/088 |
| 2021/0105765 A1* | 4/2021 | Cirik | H04W 76/18 |
| 2021/0136604 A1* | 5/2021 | Zhou | H04B 7/0695 |
| 2022/0109547 A1* | 4/2022 | Svedman | H04B 7/0626 |

FOREIGN PATENT DOCUMENTS

| | | |
|---|---|---|
| CN | 110798894 A | 2/2020 |
| CN | 111093219 A | 5/2020 |
| WO | WO-2019137184 A1 | 7/2019 |
| WO | WO-2021088963 A1 | 5/2021 |

OTHER PUBLICATIONS

Mediatek Inc., "Summary #2 on Remaining issues on Beam Failure Recovery", 3GPP TSG RAN WG1, Meeting #94, RI-1809926, Gothenburg, Sweden, Aug. 20, 2018, 30 pages.
Office Action for Australian Application No. 2020378138, dated Jan. 27, 2023, 4 pages.
International Search Report for Application No. PCT/CN2020/127023, dated Feb. 7, 2021, 4 pages including English translation.
First Office Action in Korean Application No. 10-2022-7019048, dated Nov. 26, 2024, 11 pages, including translation.
Mediatek Inc., "Summary on Beam Failure Recovery", 3GPP TSG RAN WG1, Meeting #95, RI-1814069, Spokane, US, Nov. 12-16, 2018, 24 pages.

* cited by examiner

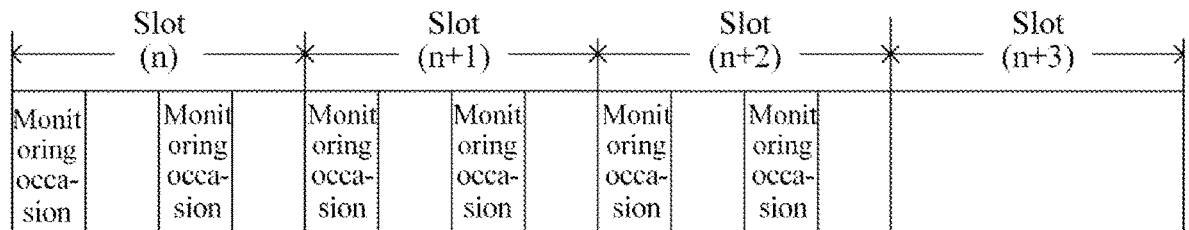
FIG. 1
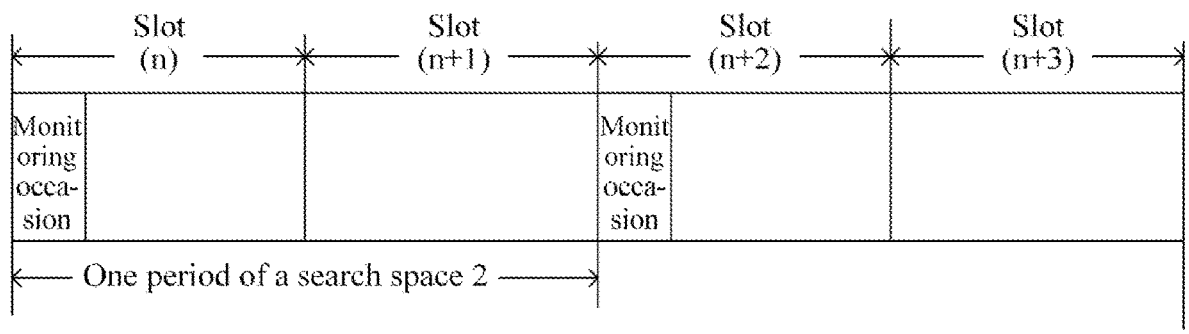
FIG. 2
FIG. 3

METHOD AND APPARATUS FOR DETERMINING INFORMATION, METHOD AND APPARATUS FOR DETERMINING CORRESPONDING RELATIONSHIP, DEVICE, AND STORAGE MEDIUM

The present application claims priority to Chinese Patent Application No. 201911083769.3 filed with the China National Intellectual Property Administration (CNIPA) on Nov. 7, 2019, the disclosure of which is incorporated herein by reference in its entirety.

TECHNICAL FIELD

The present application relates to the field of radio communication, for example, a method and apparatus for determining information, a method and apparatus for determining corresponding relationship, a device, and a medium.

BACKGROUND

In a millimeter-wave system of the 5th generation mobile communication system (5G), due to relatively severe channel fluctuations, beam misalignment may occur between a base station and a user. Beam fault recovery can help the base station or user turn the current fault beam to an available beam according to a beam measurement result, thereby avoiding frequent radio link failures caused by beam misalignment. A beam failure recovery (BFR) process is defined in a new radio (NR), but only the case where the number of control resource sets (CORESETs) is relatively small is considered. In the case of a great number of CORESETs or to-be-detected frequency domain bandwidths, how to reduce the complexity of terminal detection, to perform beam failure recovery rapidly, and to improve the robustness of a link is an urgent problem to be solved. Similarly, this problem also exists in radio link detection. The number of radio link detection reference signals that can be detected by a terminal is limited. Accordingly, how to guarantee the complexity of terminal detection and perform effective radio link detection is also an urgent problem to be solved.

SUMMARY

The present application provides a method and apparatus for determining information, a method and apparatus for determining a corresponding relationship, a device, and a medium. Accordingly, in the case of a large number of CORESETs or frequency domain bandwidths, the problem of how to reduce the complexity of terminal detection, to perform beam failure recovery rapidly, and to improve the robustness of a link is solved and the problem of how to guarantee the complexity of terminal detection and perform effective radio link detection is solved.

Embodiments of the present application provide a method for determining information. The method includes the followings.

Second information is determined according to first information.

The first information includes at least one of the following: a time domain parameter of a search space, a CORESET group, a CORESET set, the number of CORESETs, the number of frequency domain bandwidths, a frequency domain bandwidth group, a PUCCH resource group, a first-type beam failure recovery parameter, signaling information, or a predetermined rule.

The second information includes at least one of the following: a second-type beam failure recovery parameter, a radio link reference signal, a frequency domain bandwidth corresponding to a MAC-CE signaling, a PUCCH resource corresponding to the MAC-CE signaling, or a quasi co-location parameter of a downlink channel or downlink signal.

Embodiments of the present application provide a method for determining a corresponding relationship. The method includes the followings.

A first corresponding relationship is determined according to signaling information and/or a predetermined rule.

The first corresponding relationship includes at least one of the following: a corresponding relationship between N pieces of third information and M sets of beam failure recovery parameters or a corresponding relationship between a first-type frequency domain bandwidth group and a second-type frequency domain bandwidth group.

N and M are each a positive integer greater than or equal to 1. A piece of third information includes at least one of the following: a CORESET group or a frequency domain bandwidth group.

Embodiments of the present application further provide an information determination apparatus. The apparatus includes an information determination module.

The information determination module is configured to determine second information according to first information.

The first information includes at least one of the following: a time domain parameter of a search space, a CORESET group, a CORESET set, the number of CORESETs, the number of frequency domain bandwidths, a frequency domain bandwidth group, a PUCCH resource group, a first-type beam failure recovery parameter, signaling information, or a predetermined rule.

The second information includes at least one of the following: a second-type beam failure recovery parameter, a radio link reference signal, a frequency domain bandwidth corresponding to a MAC-CE signaling, a PUCCH resource corresponding to the MAC-CE signaling, or a quasi co-location parameter of a downlink channel or downlink signal.

Embodiments of the present application provide a corresponding relationship determination apparatus. The apparatus includes a corresponding relationship determination module.

The corresponding relationship determination module is configured to determine a first corresponding relationship according to signaling information and/or a predetermined rule.

The first corresponding relationship includes at least one of the following: a corresponding relationship between N pieces of third information and M sets of beam failure recovery parameters or a corresponding relationship between a first-type frequency domain bandwidth group and a second-type frequency domain bandwidth group.

N and M are each a positive integer greater than or equal to 1. A piece of third information includes at least one of the following: a CORESET group or a frequency domain bandwidth group.

Embodiments of the present application further provide a communication device. The communication device includes one or more processors and a memory configured to store one or more programs. When executed by the one or more processors, the one or more programs cause the one or more processors to perform the method for determining the information according to any embodiment of the present application.

Embodiments of the present application further provide a storage medium. The storage medium stores a computer program. When the computer program is executed by a processor, the method for determining the information according to any embodiment of the present application is performed.

Embodiments of the present application further provide a communication device. The communication device includes one or more processors and a memory configured to store one or more programs. When executed by the one or more processors, the one or more programs cause the one or more processors to perform the method for determining the corresponding relationship according to any embodiment of the present application.

Embodiments of the present application further provide a storage medium. The storage medium stores a computer program. When the computer program is executed by a processor, the method for determining the corresponding relationship according to any embodiment of the present application is performed.

BRIEF DESCRIPTION OF DRAWINGS

FIG. 1 is a flowchart of a method for determining information according to the present application.

FIG. 2 is a diagram illustrating the comparison of search spaces according to the present application.

FIG. 3 is a flowchart of a method for determining a corresponding relationship according to the present application.

DETAILED DESCRIPTION

Figure 4:
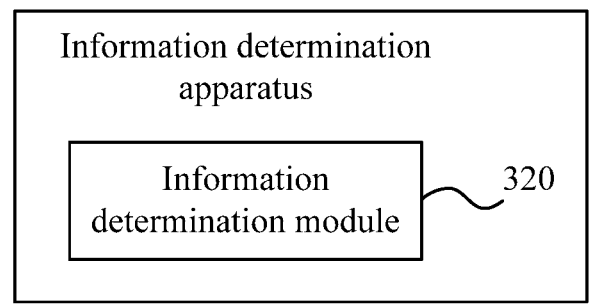
FIG. 4 is a diagram illustrating the structure of an information determination apparatus according to the present application.

Embodiments of the present application are described below in conjunction with drawings.

Before embodiments of the present application are described, related concepts are described exemplarily first.

In the present application, A refers to one or more of the following: the maximum number of reference signals included in a beam failure detection reference signal set, the maximum number of reference signals included in a radio link detection reference signal set, or the maximum number of predetermined-type reference signals. One predetermined-type reference signal is used for beam failure detection and/or radio link detection. For example, A is equal to 2. Alternatively, A is determined according to the number of CORESET groups. The greater the number of CORESET groups, the greater the A. For example, when one CORESET group exists, A is 2. When two CORESET groups exist, A is 4. Moreover/alternatively, A is determined according to the number of CORESETs. The greater the number of CORESETs, the greater the A. Moreover/alternatively, A is determined according to the number of quasi co-location reference signals associated with a predetermined quasi co-location parameter and in a CORESET. For example, the greater the number of quasi co-location reference signals associated with the predetermined quasi co-location parameter in the CORESET, the greater the A.

As shown in Table 1, $N_{RLM}$ in Table 1 denotes the maximum number A of radio link detection reference signals. $N_{LR-RLM}$ in Table 1 denotes the maximum number A of predetermined-type reference signals. In Table 1, A is determined according to the maximum number $L_{max}$ of synchronization signal physical broadcast channel blocks (SSBs).

TABLE 1

| The Maximum Number $L_{max}$ of SSBs | The Maximum Number $N_{LR-RLM}$ of Predetermined-type Reference Signals | The Maximum Number $N_{RLM}$ of Radio Link Detection Reference Signals |
| --- | --- | --- |
| 4 | 2 | 2 |
| 8 | 6 | 4 |
| 64 | 8 | 8 |

In the present application, a quasi co-location reference signal associated with the predetermined quasi co-location parameter and in a CORESET includes a quasi co-location reference signal satisfying a quasi co-location relationship, with respect to the predetermined quasi co-location parameter, with a demodulation reference signal (DMRS) of a physical downlink control channel (PDCCH) in the CORESET.

In the present application, acquiring information a according to information b includes one of the following: An acquisition parameter of information a includes information b, or information a is information b.

In the present application, that two pieces of information are associated with each other includes at least one of the following: One piece of information is acquired according to the other piece of information; the two pieces of information correspond to each other; the value range of one piece of information is determined according to the value of the other piece of information; or some combinations of the two pieces of information cannot exist simultaneously.

In the present application, a component carrier (CC) may also be referred to as a serving cell.

In the present application, a beam failure detection reference signal of CC1 is located in CC1 and may also be located in another CC. Unless otherwise stated, in the description hereinafter, a beam failure detection reference signal is a beam failure detection reference signal of one CC.

In the present application, a candidate reference signal of one CC may be located in the CC or may also be located in another CC. Unless otherwise stated, in the description hereinafter, a candidate reference signal is a candidate reference signal of one CC.

In the present application, a signaling for activating or updating a transmission configuration indication (TCI) state identifier (state ID) of a physical downlink shared channel (PDSCH) may also be referred to as a signaling for activating or updating a mapping table between a bit field value codepoint of a TCI indicator field in downlink control information (DCI) and a TCI state ID. The TCI state ID of the PDSCH is determined according to the mapping table and the codepoint value indicated by the TCI field in the DCI scheduling the PDSCH.

In the present application, a high-layer signaling includes a signaling outside a physical control channel, for example, one or more of a radio resource control (RRC) signaling or a medium access control-control element (MAC-CE) signaling.

In the present application, a reference signal is equivalent to a reference signal set; that is, a reference signal indicates one or more reference signals. The reference signal includes at least one of the following reference signals: a beam failure detection reference signal, a radio link detection reference signal, or a new reference signal.

In the present application, a new reference signal may also be referred to as a reference signal selected from a candidate reference signal set.

In the present application, a beam failure recovery process includes one or more of the processes below.

(1) In a beam failure detection process, it is determined, by detecting a reference signal in a beam failure detection reference signal set, whether a beam failure event occurs. When the performance of all reference signals in the beam failure detection reference signal set is lower than a predetermined threshold, a terminal records a beam failure moment once. When beam failure moments reach a predetermined count, the terminal considers that a beam failure event occurs. When the beam failure moments are counted, the maximum interval between two consecutive beam failure moments cannot exceed the maximum duration of a beam failure detection timer. Each time a beam failure moment is received, the beam failure detection timer is started or restarted. If no beam failure moment is detected before the beam failure detection timer expires, the accumulated value of beam failure moments falls to zero.

(2) Beam failure request information is transmitted. When a beam failure event is detected, the terminal transmits the beam failure request information to a base station. Two methods of beam failure request information transmission are described below.

In method one of beam failure request information transmission, in the case of a beam failure recovery process of a special cell (SpCell), including a primary cell (PCell) and/or a primary secondary cell group (SCG) cell (PSCell), the beam failure request information is transmitted by transmitting a physical random access channel (PRACH). Before the beam failure request information is transmitted, the base station establishes an association relationship between a PRACH resource and a reference signal in a candidate reference signal set through signaling information. After receiving a PRACH resource transmitted by the terminal, the base station determines a reference signal, that is, a new reference signal, selected from the candidate reference signal set. It is to be understood that different reference signals in the candidate reference signal set correspond to different transmission beams. A new reference signal can be understood as a beam selected from multiple transmission beams represented by the candidate reference signal set. Different PRACH resources are distinguished from each other according to one or more of frequency domain resources, time domain resources, code domain resources and spatial domain resources where PRACHs are located. A spatial domain resource includes a spatial transmission filter. For example, a PRACH is configured with spatial relationship information including a downlink reference signal or an uplink reference signal. A spatial transmission filter of the PRACH is obtained according to a receiving filter of the downlink reference signal configured in the spatial relationship information. Alternatively, the spatial transmission filter of the PRACH is obtained according to a transmission filter of the uplink reference signal configured in the spatial relationship information.

In method two of beam failure request information transmission, in the case of a beam failure recovery process of a secondary cell (SCell), the transmission of the beam failure request information is divided into two processes. In process one, the terminal transmits a scheduling request (SR) information of a resource request. The SR information of the resource request is an SR (referred to as a beam failure recovery SR) specially configured for the beam failure recovery of the SCell. In process one, the SR does not carry new reference signal information and/or failed SCell index information but only tells the base station that the SCell has a beam failure. After receiving the beam failure recovery SR, the base state assigns a physical uplink shared channel (PUSCH) to the terminal. In process two, the terminal carries the new reference signal information and/or failed SCell index information in the PUSCH. The information in process one and/or the information in process two is transmitted in the PCell or in the SCell able to transmit an uplink channel.

As for a SCell with both downlink and uplink, that is, a SCell in which one or more of a physical uplink control channel (PUCCH) or a PUSCH can be transmitted, the preceding method one or method two can be used for transmitting the beam failure request information. In method one, a PRACH may be on the SCell with beam failure. Alternatively, a corresponding relationship between a PUCCH resource in the SCell and a reference signal in the candidate reference signal set is established. The beam failure request information is transmitted by transmitting a PUCCH resource.

(3) A beam failure response is detected. If method one of beam failure request information transmission is used, the beam failure request information is considered successfully transmitted when a downlink control channel is detected in a beam failure recovery CORESET in a failed cell. If method two of beam failure request information transmission is used, after the terminal transmits the PUSCH in process two, the information in process two is considered successfully transmitted when the terminal receives the scheduling that has the same process as the PUSCH and instructs the terminal to transmit new data. That is, the beam failure response information transmitted by the base station is received.

(4) From a first predetermined moment after the beam failure request information is transmitted, a determination rule of a quasi co-location reference signal of a downlink channel or downlink signal is predetermined. For example, a quasi co-location reference signal of a demodulation reference signal of a PDCCH in a CORESET associated with a beam failure recovery search space is indicated and determined according to a new reference signal reported in the beam failure request information. A quasi co-location reference signal of a demodulation reference signal of a PDSCH scheduled by a PDCCH in the beam failure recovery search space is also acquired according to the new reference signal reported in the beam failure request information.

(5) From a second predetermined moment after the beam response information is received, a determination rule of the spatial transmission filter information of an uplink channel is predetermined. For example, the spatial relationship information of a PUCCH in a beam failure frequency domain bandwidth is determined according to a spatial transmission filter of a channel or signal including the beam failure request information. Alternatively, the spatial relationship information of the PUCCH in the beam failure frequency domain bandwidth is determined according to the new reference signal information. If the beam failure request information is transmitted in the SCell by using the manner of transmitting a PUCCH, a spatial transmission filter of the PUCCH is determined according to new reference signal indication information.

In an exemplary embodiment, FIG. 1 is a flowchart of a method for determining information according to the present application. The method is applicable to the case of performing beam failure recovery when a large number of CORESETs or a large number of frequency domain bandwidths exist. This method may be performed by an information determination apparatus provided in the present application. The information determination apparatus may be implemented by software and/or hardware and integrated on a communication device, for example, a user equipment (UE).

As shown in FIG. 1, a method for determining information provided in the present application includes S120.

In S120, second information is determined according to first information.

The first information includes at least one of the following: a time domain parameter of a search space, a CORESET group, a CORESET set, the number of CORESETs, the number of frequency domain bandwidths, a frequency domain bandwidth group, a PUCCH resource group, a first-type beam failure recovery parameter, signaling information, or a predetermined rule.

The second information includes at least one of the following: a second-type beam failure recovery parameter, a radio link reference signal, a frequency domain bandwidth corresponding to a MAC-CE signaling, a PUCCH resource corresponding to the MAC-CE signaling, or a quasi co-location parameter of a downlink channel or downlink signal.

In the present application, unless otherwise stated, one CORESET group includes CORESETs in one or more frequency domain bandwidths. One frequency domain bandwidth includes one of the following: a serving cell, a carrier, a bandwidth part (BWP), or a physical resource block (PRB) set. One PRB set includes consecutive PRBs or inconsecutive PRBs. CORESETs in one CORESET group may include the same identifier information. Identifier information may be understood as the identifier or another name of a CORESET group.

In the present application, CORESETs included in one CORESET set have the same quasi co-location reference signal associated with a predetermined quasi co-location parameter. Alternatively, CORESETs in one CORESET set satisfy a quasi co-location relationship with respect to the predetermined quasi co-location parameter. CORESETs in different CORESET sets have different quasi co-location reference signals associated with the predetermined quasi co-location parameter. Alternatively, CORESETs in different CORESET sets do not satisfy a quasi co-location relationship with respect to the predetermined quasi co-location parameter. The predetermined quasi co-location parameter includes one or more of the following parameters: a spatial Rx parameter, a Doppler shift, a Doppler spread, an average delay, a delay spread, or an average gain.

In an example, a CORESET set satisfies at least one of the features below.

CORESETs in the same CORESET set satisfy a quasi co-location relationship with respect to the predetermined quasi co-location parameter. CORESETs in the same CORESET set have the same quasi co-location reference signal associated with the predetermined quasi co-location parameter. CORESETs in different CORESET sets do not satisfy a quasi co-location relationship with respect to the predetermined quasi co-location parameter. CORESETs in different CORESET sets have different quasi co-location reference signals associated with the predetermined quasi co-location parameter.

In an example, a beam failure recovery parameter includes at least one of the following: a beam failure detection reference signal set, a candidate reference signal set, a new reference signal, a downlink channel and/or downlink signal whose quasi co-location reference signal is acquired according to the new reference signal, an uplink channel and/or uplink signal whose a spatial transmission filter parameter is acquired according to the new reference signal, an uplink channel or uplink signal whose spatial transmission filter information is acquired according to a spatial transmission filter of a channel or signal including beam failure request information, a beam failure detection counter, a beam failure request information transmission counter, a beam failure detection timer, a beam failure recovery timer, a monitoring timer, the channel or signal including the beam failure request information, a beam failure recovery control channel resource including monitoring beam failure response information, a CORESET satisfying a quasi co-location relationship with a beam failure detection reference signal, a beam failure recovery parameter of one frequency domain bandwidth, a priority corresponding to SR information of a resource request including the beam failure request information, or a parameter configured or determined for a beam failure recovery process.

In an example, an uplink channel includes a PUCCH. The PUCCH satisfies at least one of the features below.

The PUCCH belongs to one PUCCH group. The PUCCH is associated with a predetermined CORESET group. The PUCCH includes PUCCHs belonging to different PUCCH groups.

In an example, the time domain parameter of the search space includes at least one of the following: the period of the search space, the number of monitoring occasions of the search space in one slot, the number of monitoring occasions of the search space in one period, or the number of slots for which one monitoring occasion of the search space lasts.

The preceding technical solutions are provided for the case of a large number of CORESETs or frequency domain bandwidths so as to solve the problem of how to reduce the complexity of terminal detection, to perform beam failure recovery rapidly, and to improve the robustness of a link.

In an example, the process in which the second information is determined according to the first information includes the processes below.

A first-type CORESET is determined according to the first information. The second information is determined according to the first-type CORESET. The first-type CORESET includes at most A CORESETs; alternatively, the first-type CORESET includes at most A CORESET sets. A is a positive integer greater than or equal to 1.

The first-type CORESET includes one or more CORESETs. Alternatively, the first-type CORESET includes CORESETs of one frequency domain bandwidth.

Alternatively, the number of CORESETs included the first-type CORESET is less than or equal to the number of CORESETs included in one frequency domain bandwidth. The first-type CORESET is used for determining the second information. CORESETs not belonging to the first-type CORESET and in one frequency domain bandwidth are not used for determining the second information; for example, such CORESETs are not used for determining a beam failure detection reference signal and are not used for acquiring the quasi co-location reference signal according to the new reference signal.

In an example, the second information includes a reference signal set. The reference signal set includes at least one of the following reference signal sets: a beam failure detection reference signal set, a radio link detection reference signal set, or a new reference signal set. The reference signal set includes at most A reference signals. A is a positive integer greater than or equal to 1.

In an example, A is associated with at least one of the following: the number of CORESET groups, the number of CORESETs, reported capacity information, the number of frequency domain bandwidth groups, or the maximum number of SSBs.

The capacity information may be the terminal-reported capacity information for processing the reference signal set. For example, the capacity information may be the terminal-reported maximum number of reference signals that can be included in the reference signal set.

In an example, the process in which the second information is determined according to the first information includes at least one of the processes below.

In the case where the number of frequency domain bandwidths is greater than a first predetermined value, the second information is determined according to the first information. In the case where the number of frequency domain bandwidths configured with the second information is greater than a second predetermined value, the second information is determined according to the first information. In the case where the total number of first-type reference signals in the frequency domain bandwidth group is greater than a third predetermined value, the second information is determined according to the first information. In the case where the total number of first-type reference signals in the frequency domain bandwidth group is greater than a fourth predetermined value in a predetermined time segment, the second information is determined according to the first information. Here a first-type reference signal includes at least one of the following: a beam failure detection reference signal, a radio link detection reference signal, or a new reference signal.

Each frequency domain bandwidth in the preceding frequency domain bandwidth group is configured with the second information. The frequency domain bandwidth group is also referred to as a first-type frequency domain bandwidth group.

In an example, the implementation of determining the first-type CORESET according to the first information includes one of the processes below.

The first-type CORESET is determined according to a CORESET in a target CORESET group.

The first-type CORESET is constituted by one CORESET selected from each CORESET group.

The first-type CORESET is determined according to a sequence of first keeping the priority of each CORESET in each CORESET group unchanged and each CORESET group index in ascending order and then keeping the priority of each CORESET in each CORESET group in descending order. For example, the first-type CORESET is selected from a CORESET in one frequency domain bandwidth according to this sequence.

The first-type CORESET is determined according to a sequence of keeping each CORESET group index unchanged and the priority of each CORESET in each CORESET group in descending order and then keeping each CORESET group index in ascending order.

The first-type CORESET is determined according to a time domain parameter of a search space associated with a CORESET.

The first-type CORESET is determined according to a CORESET in one frequency domain bandwidth in one frequency domain bandwidth group. Reference may be made to a third manner in application embodiment four.

The first-type CORESET is determined according to a CORESET in one frequency domain bandwidth in one frequency domain bandwidth group and with the frequency domain bandwidth index satisfying a predetermined feature. Reference may be made to a third manner in application embodiment four.

The first-type CORESET is determined according to a CORESET in a frequency domain bandwidth with the frequency domain bandwidth index satisfying a predetermined feature. Reference may be made to the description in application embodiment four.

The first-type CORESET is determined according to a beam failure detection reference signal. Reference may be made to the description in solutions 7 and 11 in application embodiment six.

The first-type CORESET is acquired according to a CORESET corresponding to a new reference signal. A corresponding relationship between the new reference signal and the CORESET is acquired through signaling information. Reference may be made to the description in solution 13 in application embodiment six.

The first-type CORESET is determined according to whether a frequency domain bandwidth is a primary frequency domain bandwidth. Reference may be made to the description in solution 14 in application embodiment six.

In the case where the first-type CORESET is determined according to a CORESET in one frequency domain bandwidth in one frequency domain bandwidth group and with the frequency domain bandwidth index satisfying a predetermined feature, the frequency domain bandwidth group may have only one frequency domain bandwidth satisfying the predetermined feature. The only one frequency domain bandwidth, for example, may be a frequency domain bandwidth with the lowest (or highest) frequency domain bandwidth index and in the frequency domain bandwidth group. The frequency domain bandwidth group is referred to as a second-type frequency domain bandwidth group. Different from the preceding first-type frequency domain bandwidth group, not each frequency domain bandwidth in the second-type frequency domain bandwidth group is configured with the second information.

The preceding determination of the first-type CORESET may also be referred to as the selection of the first-type CORESET.

In an example, in the case of determining the first-type CORESET according to the CORESET in the target CORESET group, the target CORESET group satisfies at least one of the features below.

The target CORESET group has the highest priority among CORESET groups. The CORESET group index of the target CORESET group satisfies a predetermined feature; here the predetermined feature satisfied by the CORESET group index may be that the CORESET group index is the highest or that the CORESET group index is the lowest. The target CORESET group includes a CORESET associated with a search space whose time domain parameter satisfies a predetermined feature. The target CORESET group is acquired according to the received signaling information which, for example, includes a CORESET group index for determining the first-type CORESET. Among the CORESET groups, the target CORESET group includes the largest number of CORESETs. Among the CORESET groups, the target CORESET group includes the largest number of CORESET sets. The target CORESET group includes a CORESET with the CORESET index satisfying a predetermined feature, for example, a CORESET with the lowest CORESET index. Among the CORESET groups, the target CORESET group includes the largest number of CORESETs associated with search spaces whose time domain parameters satisfy a predetermined feature. Among the CORESET groups, the target CORESET group includes the largest number of CORESET sets associated with search spaces whose time domain parameters satisfy a predetermined feature. One CORESET group is included in the target CORESET group.

In an example, the preceding predetermined feature which a time domain parameter of a preceding search space satisfies may be that the search space has the shortest period, that the search space has the largest number of monitoring occasions in one slot, that the search space has the largest number of monitoring occasions in one period, that the search space has the largest number of slots for which one monitoring occasion lasts, and the like.

In an example, in the case of determining the first-type CORESET according to the CORESET in the target CORESET group, the target CORESET group is determined according to at least one of the following: a CORESET group index, a time domain parameter of a search space associated with a CORESET included in a CORESET group, the number of CORESETs included in a CORESET group, the number of CORESET sets included in a CORESET group, or the index of a CORESET included in a CORESET group.

A description is made by taking an example in which a beam failure recovery parameter is a beam failure detection reference signal set. Reference signals in the beam failure detection reference signal set correspond to one CORESET group. For example, a reference signal in the beam failure detection reference signal set satisfies a quasi co-location relationship with a demodulation reference signal of a PDCCH in a CORESET in one CORESET. Each reference signal in the beam failure detection reference signal set can be configured or acquired in an implicit manner. The acquisition in an implicit manner includes obtaining the beam failure detection reference signal set according to a quasi co-location reference signal, associated with the predetermined quasi co-location parameter, of a CORESET in one CORESET group. For example, one frequency domain bandwidth has a total of five CORESETs. The five CORESETs are divided into two groups. CORESET group 1 includes {CORESET1, CORESET2, CORESET4}. CORESET group 2 includes {CORESET3, CORESETS}. The beam failure detection reference signal set can include only two reference signals. Accordingly, it can be specified that a terminal makes a determination according to CORESETs in one CORESET group. In this case, the link performance of CORESETs in only one CORESET group is detected. When the link performance regarding this group is relatively poor (for example, when beam failure moments reach a predetermined count), it is considered that a beam failure event occurs. The preceding CORESET group for determining the beam failure detection reference signal set is the target CORESET group.

The target CORESET group satisfies at least one of the following features: a predetermined CORESET group, a primary CORESET group, a CORESET group with the lowest CORESET group index, a CORESET group configured through signaling information by a base station, a CORESET group including the largest number of CORESETs, a CORESET group including the largest number of CORESET sets, or a CORESET group with the highest priority. The priority of a CORESET group is determined according to a time domain parameter of a search space associated with a CORESET in the CORESET group.

In an example, in the case where the first-type CORESET is constituted by one CORESET selected from each CORESET group, reference signals in the beam failure detection reference signal set correspond to multiple CORESET groups. In the CORESET selection, one CORESET can be selected from each CORESET group.

In an example, when the first-type CORESET is selected according to the sequence of first keeping the priority of each CORESET in each CORESET group unchanged and each CORESET group index in ascending order and then keeping the priority of each CORESET in each CORESET group in descending order, reference signals in the beam failure detection reference signal set correspond to more than one CORESET group. In this case, each CORESET in each CORESET group can be sorted by priority. First, the level of each CORESET in each CORESET group is kept unchanged and each CORESET group is in ascending order. Then the level of each CORESET in each CORESET group is in descending order. Accordingly, CORESETs are selected in this sequence. That is, the CORESETs are selected from the CORESET groups in turn. Then beam failure detection reference signals are determined according to the selected CORESETs. The higher the level of a CORESET, the higher the priority of the CORESET that is selected as a first CORESET.

For example, one frequency domain bandwidth has a total of five CORESETs. CORESET group 1 includes {CORESET1, CORESET2, CORESET4}. CORESET group 2 includes {CORESET3, CORESETS}. Priorities of CORESETs in each preceding CORESET group are in descending order according to the preceding sequence. If A is equal to 2, CORESETs finally selected are {CORESET1, CORESET3}. That is, one CORESET is selected from each of the two CORESET groups. If A is equal to 3, CORESETs finally selected are {CORESET1, CORESET3, CORESET2}. That is, CORESET1 is selected from CORESET group 1 first; then CORESET3 is selected from CORESET group 3; finally, CORESET2 is selected from CORESET group 1.

In an example, when the first-type CORESET is determined according to the sequence of keeping each CORESET group index unchanged and the priority of each CORESET in each CORESET group in descending order and then keeping each CORESET group index in ascending order, reference signals in the beam failure detection reference signal set correspond to more than one CORESET group. In this case, each CORESET in each CORESET group can be sorted by priority. First, each CORESET group index is kept unchanged (that is, the level of each CORESET group is unchanged) and the priority of each CORESET in each CORESET group is in descending order. Then each CORESET group index is in ascending order. Accordingly, CORESETs are selected in this sequence. That is, after a CORESET is first selected from one CORESET group, then a CORESET is selected from the next CORESET group. Then beam failure detection reference signals are determined according to the selected CORESETs. In the preceding sequence, each CORESET group index is in ascending order. Each CORESET group index may also be in descending order. In the preceding CORESET level sorting, CORESETs belonging to one CORESET set correspond to the same level. That is, only one CORESET is selected from one CORESET set so as to be classified into the first-type CORESET.

When only one CORESET group exists, the beam failure detection reference signal set can be determined according to the priority of each CORESET. When more than one CORESET group exists, the beam failure detection reference signal set can be determined according to the preceding solution in which reference signals in the beam failure detection reference signal set correspond to multiple CORESET groups; alternatively, the beam failure detection reference signal set can be determined according to the solution in which reference signals in the beam failure detection reference signal set correspond to one CORESET group.

The number B of reference signals actually included in the beam failure detection reference signal set is determined according to the number of CORESET groups. For example, the more the CORESET groups, the greater the maximum number A of reference signals included in the beam failure detection reference signal set and/or the number B of reference signals actually included in the beam failure detection reference signal set.

For the case where one BWP can be configured with at most five CORESETs while only two beam recovery detection reference signals or radio link detection reference signals exist, the preceding technical solutions provide a solution of how to determine to-be-detected reference signals among the five CORESETs. In an example, a reference signal set can be determined according to the number of CORESETs. The reference signal set includes at least one of the following: a beam failure detection reference signal set or a radio link detection reference signal set. Reference may be made to the method described in application embodiment two.

In an example, a reference signal set can be determined according to the number of CORESET sets. The reference signal set includes at least one of the following: the beam failure detection reference signal set or the radio link detection reference signal set. A description is made hereinafter by taking an example of a beam failure detection reference signal set. Reference may be made to the method described in application embodiment three.

In an example, the process in which the first-type CORESET is determined according to the first information includes the process below.

The first-type CORESET is determined in a CORESET included in one frequency domain bandwidth according to a time domain parameter of a search space associated with the CORESET. Alternatively, the first-type CORESET is determined in a CORESET included in one CORESET group according to the time domain parameter of the search space associated with the CORESET.

The time domain parameter of the search space includes at least one of the following: the period of the search space, the number of monitoring occasions of the search space in one slot, the number of monitoring occasions of the search space in one period, or the number of slots for which one monitoring occasion of the search space lasts.

In an example, the first-type CORESET includes A CORESETs. A search spaces associated with the A CORESETs satisfy one of the features below.

The A search spaces have the shortest periods. For example, one BWP has five CORESETs, two CORESETs finally selected are two CORESETs associated with search spaces with the shortest periods among the five CORESETs. In this case, the shortest periods of the two search spaces may be not the absolute minimum because it is necessary to consider the search space with the shortest period and the search space with the second shortest period. The shortest periods here are considered at the CORESET level.

The A search spaces have the largest numbers of monitoring occasions in one slot.

The A search spaces have the largest numbers of slots for which one monitoring occasion lasts.

The A search spaces have the highest time domain density. The time domain density is determined according to time domain parameters.

The first-type CORESET includes at most A CORESETs. Alternatively, the first-type CORESET includes at most A CORESET sets. A is a positive integer greater than or equal to 1.

In an example, the time domain density is determined according to one of the following: a first quotient or a second quotient.

The first quotient is equal to a quotient of a first product and the period of a search space. The first product is equal to a product of the number of monitoring occasions of the search space in one slot and the number of slots for which one monitoring occasion of the search space lasts. The second quotient is equal to a quotient of the number of monitoring occasions of a search space in one slot and the period of the search space.

The priority of a CORESET group or the priority of a CORESET in a CORESET group is determined according to a time domain parameter of a search space. Reference may be made to the description in application embodiment one.

In an embodiment, the first-type CORESET may also be selected from a CORESET in one predetermined frequency domain bandwidth in one frequency domain bandwidth group. Alternatively, the first-type CORESET is selected from a CORESET in a frequency domain bandwidth with the frequency domain bandwidth index satisfying a predetermined feature. Reference may be made to the description in application embodiment four.

In an example, a frequency domain bandwidth group is associated with a beam failure recovery parameter. Reference may be made to application embodiment eight and solutions 2, 4, 6, 8, and 10 in application embodiment six.

In an example, the first-type CORESET may also be determined according to a CORESET corresponding to a new reference signal. A corresponding relationship between new reference information and the CORESET is acquired through signaling information. Reference may be made to the description in solution 13 in application embodiment six.

In an example, the first-type CORESET may also be determined according to whether a frequency domain bandwidth is a primary frequency domain bandwidth. Reference may be made to the description in solution 14 in application embodiment six.

In an example, in the case where the first information includes signaling information and/or a frequency domain bandwidth group and the second information includes a beam failure recovery parameter, determining the second information according to the first information includes at least one of the processes below.

From a first moment, a quasi co-location reference signal of a predetermined downlink channel and/or downlink signal in a second frequency domain bandwidth is acquired according to a second reference signal; here the second reference signal corresponds to a new reference signal of a first frequency domain bandwidth, and the first frequency domain bandwidth and the second frequency domain bandwidth belong to the same frequency domain bandwidth group. From a second moment, a spatial transmission filter of a predetermined uplink channel and/or uplink signal in the second frequency domain is acquired according to the new reference signal of the first frequency domain bandwidth; here the first frequency domain bandwidth and the second frequency domain bandwidth belong to the same frequency domain bandwidth group. From a third moment, a quasi co-location reference signal of a predetermined downlink channel and/or downlink signal in each frequency domain bandwidth in the frequency domain bandwidth group is acquired according to the second reference signal; here the second reference signal corresponds to the new reference signal of the first frequency domain bandwidth, and the frequency domain bandwidth group includes the first frequency domain bandwidth. From a fourth moment, a spatial transmission filter of a predetermined uplink channel and/or uplink signal in each frequency domain bandwidth in the frequency domain bandwidth group is acquired according to the new reference signal of the first frequency domain bandwidth; here the frequency domain bandwidth group includes the first frequency domain bandwidth. From a fifth moment, in the case where a quasi co-location reference signal of a CORESET in the first frequency domain bandwidth is acquired according to the new reference signal of the first frequency domain bandwidth, a quasi co-location reference signal of a CORESET in the second frequency domain bandwidth is acquired according to the second reference signal; here the second reference signal corresponds to the new reference signal of the first frequency domain bandwidth, the first frequency domain bandwidth and the second frequency domain bandwidth belong to the same frequency domain bandwidth group, and the CORESET index of the CORESET in the first frequency domain bandwidth is the same as the CORESET index of the CORESET in the second frequency domain bandwidth. It is determined according to the signaling information whether, from the first moment, only the quasi co-location reference signal of the CORESET in the first frequency domain bandwidth is acquired according to the new reference signal or a quasi co-location reference signal of a CORESET in each frequency domain bandwidth in the frequency domain bandwidth group where the first frequency domain bandwidth is located is acquired according to the second reference signal.

In the preceding example, at least one of the features below is included.

The new reference signal is in the first frequency domain bandwidth. The second reference signal is in the second frequency domain bandwidth. The second reference signal is associated with a quasi co-location reference signal of a predetermined type. The second reference signal and a predetermined downlink channel and/or downlink signal are in the same frequency domain bandwidth. The difference between the index of a transmission configuration indication (TCI) state where the second reference signal is located and the index of a TCI state where the new reference signal is located is fixed. The difference between the index of a resource where the second reference signal is located and the index of a resource where the new reference signal is located is fixed. The second reference signal is the new reference signal in the first frequency domain bandwidth. In the case where the first frequency domain bandwidth and a predetermined downlink channel and/or downlink signal are in the same serving cell, the second reference signal is the new reference signal in the first frequency domain bandwidth.

A predetermined downlink channel includes at least one of the following channels: the first-type CORESET or a downlink channel scheduled by a PDCCH in the first-type CORESET. The first-type CORESET is determined according to the first information.

In an example, the implementation of determining the first-type CORESET according to the first information includes one of the processes below.

The target CORESET group has the highest priority among CORESET groups.

The CORESET group index of the target CORESET group satisfies a predetermined feature. The target CORESET group includes a CORESET associated with a search space whose time domain parameter satisfies a predetermined feature. The target CORESET group is acquired according to the received signaling information. Among the CORESET groups, the target CORESET group includes the largest number of CORESETs. Among the CORESET groups, the target CORESET group includes the largest number of CORESET sets. The target CORESET group includes a CORESET with the CORESET index satisfying a predetermined feature. Among the CORESET groups, the target CORESET group includes the largest number of CORESETs associated with search spaces whose time domain parameters satisfy a predetermined feature. Among the CORESET groups, the target CORESET group includes the largest number of CORESET sets associated with search spaces whose time domain parameters satisfy a predetermined feature. One CORESET group is included in the target CORESET group.

In an example, the process in which the second information is determined according to the first information includes at least one of the processes below.

A frequency domain bandwidth corresponding to a first-type MAC-CE signaling is determined according to a predetermined rule; here the predetermined rule includes that in the case where an RRC signaling is configured with a frequency domain bandwidth group, the frequency domain bandwidth corresponding to the MAC-CE signaling includes the frequency domain bandwidth group or a frequency domain bandwidth group where a frequency domain bandwidth corresponding to a frequency domain bandwidth index carried in the MAC-CE signaling is located. A frequency domain bandwidth corresponding to a first-type MAC-CE signaling is determined according to a predetermined rule; here the predetermined rule includes that in the case where an RRC signaling is configured with no frequency domain bandwidth group, the frequency domain bandwidth corresponding to the MAC-CE signaling includes a frequency domain bandwidth corresponding to a frequency domain bandwidth index carried in the MAC-CE signaling. A PUCCH corresponding to a MAC-CE signaling for activating or updating PUCCH spatial relationship information is determined according to a predetermined rule; here the predetermined rule includes that in the case where an RRC signaling is configured with a PUCCH group, the PUCCH corresponding to the MAC-CE signaling includes the PUCCH group or a PUCCH group where a PUCCH resource corresponding to a PUCCH resource index carried in the MAC-CE signaling is located. A PUCCH corresponding to a MAC-CE signaling for activating or updating PUCCH spatial relationship information is determined according to a predetermined rule; here the predetermined rule includes that in the case where no PUCCH group is configured, the PUCCH corresponding to the MAC-CE signaling includes a PUCCH resource corresponding to a PUCCH resource index carried in the MAC-CE signaling. It is determined according to signaling information whether a first-type MAC-CE signaling corresponds to a frequency domain bandwidth or a frequency domain bandwidth group. The spatial relationship information of a PUCCH resource, with a predetermined PUCCH resource group index, in each frequency domain bandwidth in a frequency domain bandwidth group is activated or updated according to a MAC-CE signaling.

A first-type MAC-CE includes one of the following: a MAC-CE for activating or updating a TCI state ID of a PDSCH, a MAC-CE for activating or updating a TCI state ID of a CORESET, a PUCCH with a PUCCH spatial relationship activated or updated, or a PUCCH with the spatial relationship of a PUCCH resource group activated or updated. Reference may be made to the description in application embodiment ten.

A frequency domain bandwidth group satisfies at least one of the features below.

The division of the frequency domain bandwidth group is determined according to the signaling information. One master cell group (MCG) includes one or more frequency domain bandwidth groups. One secondary cell group (SCG) includes one or more frequency domain bandwidth groups. The frequency domain bandwidth group shares a high-layer signaling for activating or updating a TCI state ID of a PDSCH. CORESETs with the same CORESET index in the frequency domain bandwidth group share the high-layer signaling for activating or updating a TCI state ID of a PDSCH. The frequency domain bandwidth group shares a high-layer signaling for activating or updating the spatial relationship information of a PUCCH. The frequency domain bandwidth group shares a high-layer signaling for activating or updating the spatial relationship information of a PUCCH resource group. The frequency domain bandwidth group includes a BWP in one serving cell, for example, all BWPs in one serving cell.

In an example, the process in which the second information is determined according to the first information includes the process below.

From a sixth moment, a quasi co-location reference signal of a CORESET in a CORESET group is acquired according to a new reference signal corresponding to the CORESET group. Each new reference signal corresponds to one CORESET group. The new reference signal reporting information of one frequency domain bandwidth includes the indication information of more than one new reference signal. Each of the more than one new reference signal corresponds to one CORESET group. Here the first information is the CORESET group and the second information is the CORESET for acquiring a quasi co-location reference signal according to the new reference signal.

That each new reference signal corresponds to one CORESET group refers to that different new reference signals correspond to different CORESET groups.

In an example, the process in which the second information is determined according to the first information includes the process below.

At least one of the following is acquired according to a beam failure detection reference signal set: a predetermined downlink channel and/or downlink signal whose quasi co-location reference signal is determined according to a new reference signal, an uplink channel or uplink signal whose spatial transmission filter parameter is acquired according to the new reference signal, or an uplink channel or uplink signal whose spatial transmission filter parameter is acquired according to a channel or signal including beam failure request information.

The beam failure detection reference signal set in the preceding description "At least one of the following is acquired according to a beam failure detection reference signal set" is the first-type beam failure recovery parameter. "a predetermined downlink channel and/or downlink signal whose quasi co-location reference signal is determined according to a new reference signal, an uplink channel or uplink signal whose spatial transmission filter parameter is acquired according to the new reference signal, or an uplink channel or uplink signal whose spatial transmission filter parameter is acquired according to a channel or signal including beam failure request information" is the second-type beam failure recovery parameter.

In the preceding example, from a seventh moment, the quasi co-location reference signal of the predetermined downlink channel and/or downlink signal is updated according to the new reference signal. The predetermined downlink channel includes one or more of a third-type CORESET and a PDSCU scheduled by the third-type CORESET. Before the seventh moment, the third-type CORESET and a reference signal in the beam failure detection reference signal set are caused to satisfy a quasi co-location relationship; alternatively, a beam failure detection reference signal is acquired according to a quasi co-location reference signal of a CORESET.

In the preceding examples, one or more of the first moment, the second moment, the third moment, the fourth moment, the fifth moment, the sixth moment, or the seventh moment include one of the following moments: a predetermined moment after the beam failure request information of the first frequency domain bandwidth is transmitted, a predetermined moment after the response information of the beam failure request information of the first frequency domain bandwidth is received, or a moment determined according to a manner of transmitting the beam failure request information.

The first frequency domain bandwidth is configured with a beam failure recovery parameter. Alternatively, the first frequency domain bandwidth is referred to as a beam failure frequency domain bandwidth.

Each frequency domain bandwidth of the frequency domain bandwidth group where the first frequency domain bandwidth is located shares at least one piece of the following signaling information: a MAC-CE signaling for updating a TCI state of a PDSCH, an RRC signaling for configuring a TCI state of a PDSCH, a MAC-CE signaling for updating a TCI state of a CORESET, or an RRC signaling for configuring a TCI state of a CORESET.

Alternatively, when a frequency domain bandwidth is a BWP, the frequency domain bandwidth group where the first frequency domain bandwidth is located includes all BWPs in one CC.

When method one of beam failure request information transmission is used, from a predetermined moment after a beam failure request is transmitted, a quasi co-location reference signal of an above-determined CORESET is determined according to a new reference signal. When method two of beam failure request information transmission is used, from a predetermined moment after the response information including the beam failure request information and transmitted in process two is received, a quasi co-location reference signal of an above-determined CORESET is determined according to a new reference signal.

In the case where a quasi co-location reference signal of a preceding CORESET is acquired according to a new reference signal, the quasi co-location reference signal of the PDSCH scheduled in the CORESET may also be acquired according to the new reference signal.

A beam recovery based on a frequency domain bandwidth group is implemented in the preceding technical solutions.

In an example, the process in which the first-type CORESET is determined according to the first information includes the process below.

The first-type CORESET is determined in a second-type CORESET. The second-type CORESET is constituted by one CORESET selected from each CORESET set or by a CORESET in one frequency domain bandwidth.

In an example, the process in which the first-type CORESET is determined in the second-type CORESET includes at least one of the processes below.

The first-type CORESET is determined in the second-type CORESET according to the first information. In the case where the number of CORESETs in the second-type CORESET is greater than A, the first-type CORESET is determined according to the first information. In the case where the number of CORESETs in the second-type CORESET is less than or equal to A, the second-type CORESET is included in the first-type CORESET.

On the basis of the preceding technical solutions, the process in which the second information is determined according to the first-type CORESET includes at least one of the processes below.

A beam failure detection reference signal is determined according to the first-type CORESET. A radio link detection reference signal is determined according to the first-type CORESET. A downlink channel or downlink signal whose quasi co-location reference signal is determined according to a new reference signal is determined according to the first-type CORESET. An uplink channel or uplink signal is determined according to the first-type CORESET; here a spatial transmission filter of the uplink channel or uplink signal is determined according to a new reference signal. An uplink channel or uplink signal is determined according to the first-type CORESET; here a spatial transmission filter of the uplink channel or uplink signal is determined according to the channel and/or signal including the beam failure request information. A CORESET satisfying a quasi co-location relationship with a beam failure detection reference signal is determined according to the first-type CORESET. A CORESET satisfying a quasi co-location relationship with a radio link detection reference signal is determined according to the first-type CORESET.

The method further includes at least one of the processes below.

n reference signals are acquired according to n quasi co-location reference signals in m quasi co-location reference signals of one CORESET; here the m quasi co-location reference signals are each associated with a spatial Rx parameter, and m and n are each a positive integer greater than or equal to 1. Quasi co-location reference signals corresponding to q resource groups in m resource groups of one CORESET are acquired according to p new reference signals; here p and q are each a positive integer greater than or equal to 1. Reference signals and z resource groups in m resource groups of one CORESET are caused to satisfy a quasi co-location relationship; here z is a positive integer less than or equal to m.

Here a reference signal includes at least one of the following: a beam failure detection reference signal, a new reference signal, or a radio link detection reference signal. One CORESET is associated with m resource groups. Each resource group corresponds to one quasi co-location reference signal set. Reference may be made to the description in application embodiment thirteen.

In the case where the downlink channel or downlink signal whose quasi co-location reference signal is determined according to the new reference signal is determined according to the first-type CORESET, a quasi co-location reference signal of a CORESET not belonging to the first-type CORESET and in one frequency domain bandwidth is not updated according to the new reference signal, and/or a quasi co-location reference signal of a CORESET belonging to the first-type CORESET and in one frequency domain bandwidth is updated according to the new reference signal.

In an example, the process in which the second information is determined according to the first information includes the process below.

The number of sets of quasi co-location parameters of the downlink channel or downlink signal is determined according to signaling information. The signaling information includes the scheme information of a PDSCH. The interval between the downlink channel or downlink signal and a PDCCH scheduling the downlink channel or downlink signal is smaller than a predetermined value. In the case where the number of sets of quasi co-location parameters is greater than 1, different sets of quasi co-location parameters include the same-type quasi co-location parameter.

Moreover/alternatively, a receivable scheme range of the PDSCH is determined according to the capacity information reported by a communication node. The capacity information includes the number of sets of spatial Rx parameters associated with channels or signals received at the same moment. The communication node includes a communication node receiving the PDSCH. Reference may be made to the description in application embodiment fourteen.

The preceding technical solution provides a solution of how to determine the number of default beams of the PDSCH and how to both satisfy system requirements and enable the terminal to save power. That is, the number of default beams is determined according to a scheme of the PDSCH.

In an example, the process in which the second information is determined according to the first information includes the processes below.

The priority of a channel or signal where the beam failure request information is located is determined according to a predetermined rule; here the priority corresponding to the beam failure request information is a predetermined priority. The priority of the channel or signal where the beam failure request information is located is determined according to signaling information.

In an example, the beam failure request information includes at least one of the following: new reference information or a beam failure event occurring on at least one frequency domain bandwidth; the channel where the beam failure request information is located includes a PUCCH; the channel where the beam failure request information is located includes an SR-PUCCH; the priority of the channel where the beam failure request information is located is a first priority, where two priorities exist; or the priority of the channel where the beam failure request information is located is a second priority, where three priorities exist. Reference may be made to the description in application embodiment fifteen.

The preceding technical solution solves the problem of the priority selection between BFR-SR and two-level SRs of a logical channel and the problem of the multiplexing problem with a Hybrid Automatic Repeat request-Acknowledgement (HARQ-ACK).

In an exemplary embodiment, FIG. 3 is a flowchart of a method for determining a corresponding relationship according to the present application. The method is applicable to the case of performing beam failure recovery when a large number of CORESETs exist. This method may be performed by a corresponding relationship determination apparatus provided in the present application. The corresponding relationship determination apparatus may be implemented by software and/or hardware and integrated on a communication device, for example, a UE.

As shown in FIG. 3, a method for determining a corresponding relationship provided in the present application includes S220.

In S220, a first corresponding relationship is determined according to signaling information and/or a predetermined rule.

The first corresponding relationship includes at least one of the following: a corresponding relationship between N pieces of third information and M sets of beam failure recovery parameters or a corresponding relationship between a first-type frequency domain bandwidth group and a second-type frequency domain bandwidth group. N and M are each a positive integer greater than or equal to 1. A piece of third information includes at least one of the following: a CORESET group or a frequency domain bandwidth group.

In this embodiment, the corresponding relationship between the N pieces of third information and the M sets of beam failure recovery parameters is established. A piece of third information includes one or more of a CORESET group or a frequency domain bandwidth group. A beam failure recovery parameter indicates one or more parameters configured in a beam failure recovery process.

In an example, a beam failure recovery parameter includes at least one of the following parameters: a beam failure detection reference signal set, a candidate reference signal set, a new reference signal, a downlink channel and/or downlink signal whose quasi co-location reference signal is acquired according to the new reference signal, an uplink channel and/or uplink signal whose spatial transmission filter parameter is acquired according to the new reference signal, an uplink channel or uplink signal whose spatial transmission filter information is acquired according to a spatial transmission filter of a channel or signal including beam failure request information, a beam failure detection counter, a beam failure request information transmission counter, a beam failure detection timer, a beam failure recovery timer, a monitoring timer, the channel or signal including the beam failure request information, a beam failure recovery control channel resource including monitoring beam failure response information, a CORESET satisfying a quasi co-location relationship with a beam failure detection reference signal, a beam failure recovery parameter of one frequency domain bandwidth, a priority corresponding to SR information of a resource request including the beam failure request information, or a parameter configured or determined for a beam failure recovery process.

In an example, the corresponding relationship between the N pieces of third information and the M sets of beam failure recovery parameters includes at least one of the following: N third information values correspond to N sets of beam failure recovery parameters, or each third information value among the N third information values corresponds to one set of beam failure recovery parameters.

In an example, the corresponding relationship between the N pieces of third information and the M sets of beam failure recovery parameters includes at least one of the following: N third information values correspond to one beam failure detection reference signal; each third information value among the N third information values corresponds to one candidate reference signal set; or each third information value among the N third information values corresponds to one new reference signal.

In an example, in the case where each third information value among the N third information values corresponds to one new reference signal, a new reference signal corresponding to a third information value is from a candidate reference signal set corresponding to the third information value.

Reference may be made to application embodiment eight. In an example, the first-type frequency domain bandwidth group and the second-type frequency domain bandwidth group satisfy one of the features below.

The first-type frequency domain bandwidth group and the second-type frequency domain bandwidth group share a division signaling of a frequency domain bandwidth group. The first-type frequency domain bandwidth group and the second-type frequency domain bandwidth group each correspond to a division signaling of a frequency domain bandwidth group. The second-type frequency domain bandwidth group is determined according to a frequency domain bandwidth of a CORESET including a predetermined CORESET index and in the first-type frequency domain bandwidth group.

Reference may be made to application embodiments nine and ten.

To describe the preceding technical solutions, application embodiments are used for description hereinafter.

Application Embodiment One

In this embodiment, one or more of a beam failure detection reference signal set or a radio link detection reference signal set are determined according to a CORESET group. A description is made hereinafter by taking an example in which a beam failure detection reference signal is determined. The same method can be used for determining a radio link detection reference signal. Determining the beam failure detection reference signal according to a CORESET group includes one or more of the solutions below.

In solution 1, reference signals in the beam failure detection reference signal set correspond to one CORESET group. For example, a reference signal in the beam failure detection reference signal set satisfies a quasi co-location relationship with a demodulation reference signal of a PDCCH in a CORESET in one CORESET. Each reference signal in the beam failure detection reference signal set can be configured or acquired in an implicit manner. The acquisition in an implicit manner includes obtaining the beam failure detection reference signal set according to a quasi co-location reference signal, associated with the predetermined quasi co-location parameter, of a CORESET in one CORESET group. For example, one frequency domain bandwidth has a total of five CORESETs. The five CORESETs are divided into two groups. CORESET group 1 includes {CORESET1, CORESET2, CORESET4}. CORESET group 2 includes {CORESET3, CORESET5}. The beam failure detection reference signal set can include only two reference signals. Accordingly, it can be specified that a terminal makes a determination according to CORESETs in one CORESET group. In this case, the link performance of CORESETs in only one CORESET group is detected. When the link performance regarding this group is relatively poor (for example, when beam failure moments reach a predetermined count), it is considered that a beam failure event occurs. The CORESET group (referred to as a first CORESET group hereinafter) of the above-determined beam failure detection reference signal set satisfies at least one of the following features: The CORESET group is a predetermined CORESET group; the CORESET group is a primary CORESET group; the CORESET group is a CORESET group with the lowest CORESET group index; the CORESET group is a CORESET group configured by a base station through the signaling information; the CORESET group is a CORESET group including the largest number of CORESETs; the CORESET group is a CORESET group including the largest number of CORESET sets; the CORESET group is a CORESET group with a highest priority, for example, the priority of the CORESET group is determined according to a time domain parameter of a search space associated with a CORESET in the CORESET group.

In solution 2, when the number of CORESETs included in the first CORESET group is smaller than A or the number of CORESET sets included in the first CORESET group is smaller than A, one manner is that the number of reference signals included in the beam failure detection reference signal set is smaller than A and any CORESET (that is, first-type CORESET) is no longer selected. The other manner is that a reference signal included in the beam failure detection reference signal set is further determined according to a quasi co-location reference signal, associated with the predetermined quasi co-location parameter, of a CORESET in a second CORESET group.

In the case where the number of CORESETs included in the first CORESET group is greater than A or the number of CORESET sets included in the first CORESET group is greater than A, the priority of a CORESET is determined according to a time domain parameter of a search space associated with the CORESET in the first CORESET group. The beam failure detection reference signal set is determined according to CORESETs with high priorities and A CORESET sets (that is, first-type CORESETs) with high priorities.

In solution 3, reference signals in the beam failure detection reference signal set correspond to more than one CORESET group. For example, in the CORESET selection, each CORESET in each CORESET group is sorted by priority so as to obtain the relative index of each CORESET in each CORESET group. Relative CORESET indexes in each CORESET group are kept unchanged first (that is, the level of each CORESET in each CORESET group is unchanged) and each CORESET group is in ascending order. Then CORESETs are selected in a sequence where relative CORESET indexes in each CORESET group are in ascending order. That is, the CORESETs are selected from the CORESET groups in turn. Then beam failure detection reference signals are determined according to the selected CORESETs (that is, first-type CORESETs).

For example, one frequency domain bandwidth has a total of five CORESETs. CORESET group 1 includes {CORESET1, CORESET2, CORESET4}. CORESET group 2 includes {CORESET3, CORESET5}. Priorities of CORESETs in each preceding CORESET group are in descending order according to the preceding sequence. If A is equal to 2, CORESETs finally selected are {CORESET1, CORESET3}. That is, one CORESET is selected from each of the two CORESET groups. If A is equal to 3, CORESETs finally selected are {CORESET1, CORESET3, CORESET2}. That is, CORESET1 is selected from CORESET group 1 first; then CORESET3 is selected from CORESET group 3; finally, CORESET2 is selected from CORESET group 1.

In solution 4, when only one CORESET group exists, the beam failure detection reference signal set is determined according to the priority of each CORESET. When more than one CORESET group exists, the beam failure detection reference signal set is determined according to the preceding solution 1 or 2.

The number B of reference signals included in the beam failure detection reference signal set is determined according to the number of CORESET groups. For example, the more the CORESET groups, the greater the A or the B.

The priority of a CORESET group or the priority of a CORESET in a CORESET group is determined according to a time domain parameter of a search space. The time domain parameter of the search space includes at least one of the following: the period of the search space (each search space is configured independently, for example, through monitoringSlotPeriodicityAndOffset configured in each search space), monitoring occasions of the search space in one slot (each search space is configured independently, for example, through monitoringSymbolsWithinSlot), or the number of slots consecutively detected between two periods of the search space (each search space is configured independently, for example, through the duration of each search space; this parameter is referred to as the number of slots consecutively detected in one period and may also be referred to as the number of slots for which one occasion of one search space lasts; in this case, occasions with the same time domain symbol in consecutive slots are considered as one occasion; of course, this embodiment does not exclude that occurrences with the same time domain symbol in consecutive slots are considered as different occurrences; as shown in FIG. 2, search space 1 has six monitoring occasions in one period and each slot has two monitoring occasions; alternatively, in FIG. 2, search space 1 has two monitoring occasions, and the number of slots for which each monitoring occasion lasts is 3). For example, that a CORESET/CORESET group where a search space is located has a higher priority indicates one of the following: The search space has a shorter period; monitoring occasions of the search space in one slot is greater; the number of slots consecutively in one period of the search space is greater; or the detection time domain density of the search space is higher. For example, a CORESET group with the highest priority includes CORESETs associated with the following search spaces, or a CORESET with the highest priority is associated with the following search spaces: a search space with the shortest period, a search space with the largest number of associated monitoring occasions in one slot, a search space with the largest number of monitoring occasions included in one period, or a search space with the highest detection time domain density. The detection time domain density of a search space is acquired according to a time domain parameter of the search space. For example, the detection time domain density is the number of monitoring occasions in one slot*the number of slots consecutively detected (that is, the duration)/the period of the search space. Alternatively, the time-domain density is the number of monitoring occasions in one slot/the period of the search. As shown in FIG. 2, although the period of search space 1 is longer than the period of search space 2, the time-domain density of search space 1 is higher than the time-domain density of search space 2.

When time domain features of two search spaces are the same, the priority of a CORESET group or the priority of a CORESET is determined according to the index of the CORESET group or the index of the CORESET. For example, the larger (or smaller) the index of a CORESET group, the higher the priority of the CORESET group. Alternatively, the larger (or smaller) the index of a CORE- SET, the higher the priority of the CORESET. A time domain feature of a search space includes one of the following: the period of the search space, monitoring occasions of the search space in one slot, the number of slots consecutively detected of the search space in one period, or the detection time domain density of the search space. The priority of a CORESET group may also be acquired according to the index of a CORESET included in the CORESET group. For example, a CORESET group including the highest CORESET index is a CORESET group with the highest priority, or a CORESET group including the lowest CORESET index is a CORESET group with the highest priority.

In another implementation of this embodiment, for a radio link detection reference signal, the radio link detection reference signal is determined according to the maximum number of SSBs and/or the number of CORESETs in one frequency domain bandwidth. In the case where the maximum number of SSBs is 4, a first-type CORESET is determined according to a time domain parameter of a search space associated with a CORESET and/or a CORESET group, and a reference signal set is determined according to the first-type CORESET. In the case where the maximum number of SSBs is 8 and the number of CORESETs is greater than A, a first-type CORESET is determined according to a time domain parameter of a search space associated with a CORESET and/or a CORESET group.

Application Embodiment Two

In this embodiment, a reference signal set is determined according to the number of CORESETs. The reference signal set includes at least one of the following: a beam failure detection reference signal set or a radio link detection reference signal set. A description is made hereinafter by taking an example of a beam failure detection reference signal set.

When the number of CORESETs in one frequency domain bandwidth is less than or equal to A, the beam failure detection reference signal set is acquired according to a quasi co-location reference signal, associated with a spatial Rx parameter, of each CORESET in the frequency domain bandwidth.

When the number of CORESETs in one frequency domain bandwidth is greater than A, the beam failure detection reference signal set is acquired according to a CORESET group. Optionally, the acquisition of the beam failure detection reference signal set according to a CORESET group includes the method described in application embodiment one.

A quasi co-location reference signal, associated with a spatial Rx parameter, of a CORESET includes a DMRS of a PDCCH in the CORESET and satisfies a quasi co-location relationship with the quasi co-location reference signal with respect to the spatial Rx parameter.

Application Embodiment Three

In this embodiment, a reference signal set is determined according to the number of CORESET sets. The reference signal set includes at least one of the following: a beam failure detection reference signal set or a radio link detection reference signal. A description is made hereinafter by taking an example of a beam failure detection reference signal set.

When the number of CORESET sets in one frequency domain bandwidth is less than or equal to A, the beam failure detection reference signal set is acquired according to a quasi co-location reference signal, associated with a predetermined quasi co-location parameter, in each CORESET set in the frequency domain bandwidth.

When the number of CORESETs in one frequency domain bandwidth is greater than A, the beam failure detection reference signal set is acquired according to a CORESET group. Optionally, the acquisition of the beam failure detection reference signal set according to a CORESET group includes the method described in application embodiment one.

In the preceding description, the acquisition of a reference signal set according to CORESET sets may also be referred to as that a first-type CORESET is selected from CORESETs in one frequency domain bandwidth (or CORESETs included in one CORESET group) according to a sequence where the priority of each CORESET is in descending order so as to select A CORESETs in the first-type CORESET. Alternatively, all CORESETs in one frequency domain bandwidth are polled (alternatively, CORESETs included in one CORESET group are polled). In the case where a CORESET satisfies a quasi co-location relationship with the selected first-type CORESET with respect to the predetermined quasi co-location parameter, this CORESET is ignored and the selection of the next CORESET continues.

Application Embodiment Four

In this embodiment, a reference signal set is determined according to one or more of a CC, a CC group, or a CORESET group.

The reference signal set includes at least one of the following reference signal sets: a beam failure detection reference signal set or a radio link detection reference signal. A description is made hereinafter by taking an example of a beam failure detection reference signal.

In the case where the number of frequency domain bandwidths for performing a beam failure recovery process is greater than a first predetermined value or the total number of beam failure detection reference signals of multiple frequency domain bandwidths is greater than a second predetermined value, a beam failure detection reference signal is determined according to a CC index. For example, in a time segment, beam failure detection reference signals of eight CCs need to be detected. However, a terminal can detect at most beam failure detection reference signals of three CCs in a time segment. Accordingly, a beam failure detection reference signal can be determined using one or more of the solutions below.

In a first manner, beam failure detection reference signals of three CCs with the lowest (or highest) CC indexes are selected.

In a second manner, a beam failure detection reference signal of a CC in which the number of included CORESET groups satisfies a predetermined condition is selected. If the number of beam failure detection reference signals of CCs satisfying the condition is greater than the second predetermined value, each beam failure detection reference signal of one or more CCs is determined according to a CC index and/or a CC group index.

In a third manner, a beam failure detection reference signal is determined according to a CC group. Only one CC is selected from a CC group. That is, the beam failure detection of only one CC is performed in each CC group.

When it is determined whether the number of beam failure detection reference signals of multiple frequency domain bandwidths is greater than the second predetermined value, the beam failure detection reference signals of the frequency domain bandwidths are determined through an explicit signaling configured by a base station, and/or the beam failure detection reference signals of the frequency domain bandwidths are acquired in an implicit manner. For example, a beam failure detection reference signal is determined according to a CORESET in a CC.

A CC group shares a MAC-CE signaling for updating a TCI state ID of a PDSCH. For example, the MAC-CE activates the same TCI state ID set for each CC in the CC group. For example, the MAC-CE activates {TCI state 1, TCI state 3, TCI state 8, TCI state 12}. Then {TCI state 1, TCI state 3, TCI state 8, TCI state 12} of each CC in the CC group are activated. Optionally, an RRC signaling configures a TCI state list for each CC or each BWP of each CC. A TCI state activated in each CC belongs to the TCI state list in the CC.

Moreover/alternatively, a CC group shares a MAC-CE signaling for updating a TCI state ID of a CORESET. For example, the MAC-CE signaling activates TCI state-1 for CORESET-1. Then TCI state-1 is activated for CORESET-1 in each CC in the CC group. Optionally, TCI state-1 activated for CORESET-1 in each CC belongs to TCI state-1, whose relative index is 1, in a TCI state list of CORESET-1 in each CC, where the TCI state list is configured by the RRC signaling. For example, the absolute index of this TCI state whose relative index is 1 may be another value, for example, TCI state-8.

Application Embodiment Five

In this embodiment, a frequency domain bandwidth group is associated with a beam failure recovery parameter.

In one frequency domain bandwidth group, only one frequency domain bandwidth is configured with a beam failure recovery parameter, and the beam failure recovery process of only one frequency domain bandwidth is performed.

The frequency domain bandwidth of the frequency domain bandwidth group shares at least one piece of the following signaling information: a MAC-CE signaling for updating a TCI state of a PDSCH, an RRC signaling for configuring a TCI state of a PDSCH, a MAC-CE signaling for updating a TCI state of a CORESET, or an RRC signaling for configuring a TCI state of a CORESET.

Application Embodiment Six

In this embodiment, a CORESET (that is, a first-type CORESET or a predetermined downlink channel) acquiring a quasi co-location reference signal or a quasi co-location reference according to new reference signal indication information is determined according to signaling information and/or a predetermined rule.

A CORESET acquiring a quasi co-location reference signal or a quasi co-location reference according to the new reference signal indication information can be determined using one or more of the solutions below In solution 1, a quasi co-location reference signal of a CORESET in a first CORESET group in a beam failure frequency domain bandwidth is acquired according to the new reference signal indication information, and a quasi co-location reference signal of a CORESET in a second CORESET group is not updated. The first CORESET group is a CORESET with the highest priority. The priority of a CORESET group may be determined by using the preceding methods. That is, the priority of a CORESET group is determined according to one or more of the following: a time domain parameter of a search space associated with the CORESET group, the index of the CORESET group, or a CORESET index included in the CORESET group. Alternatively, the first CORESET group includes a CORESET group where a CORESET satisfying a quasi co-location relationship with a reference signal in a beam failure detection reference signal set is located.

In solution 2, a quasi co-location reference signal of a CORESET in a first CORESET group in each frequency domain bandwidth in a frequency domain bandwidth group where the beam failure frequency domain bandwidth is located is acquired according to the new reference signal indication information. The group index of a first CORESET group in each frequency domain bandwidth is the same as the group index of a first CORESET group in the beam failure frequency domain bandwidth.

In solution 3, quasi co-location reference signals of all CORESETs in the beam failure frequency domain bandwidth are acquired according to the new reference signal indication information.

In solution 4, quasi co-location reference signals of CORESETs in all CORESET groups in each frequency domain bandwidth in the frequency domain bandwidth group where the beam failure frequency domain bandwidth is located are acquired according to the new reference signal indication information.

In solution 5, a quasi co-location reference signal of a CORESET included in the beam failure frequency domain bandwidth and satisfying a quasi co-location relationship with a reference signal in the beam failure detection reference signal set is acquired according to the new reference signal indication information. A quasi co-location reference signal of a CORESET included in the beam failure frequency domain bandwidth and not satisfying a quasi co-location relationship with a beam failure detection reference signal is not updated. For example, one frequency domain bandwidth is configured with five CORESETs. Beam failure detection reference signals include two reference signals, that is, reference signal 1 and reference signal 2. {CORESET3, CORESET1} satisfy a quasi co-location relationship with reference signal 1. {CORESET4} satisfies a quasi co-location relationship with reference signal 2. Then quasi co-location reference signals of {CORESET3, CORESET1, CORESET4} are acquired according to the new reference signal indication information, while quasi co-location reference signals of {CORESET2, CORESET5} are not updated.

In solution 6, a quasi co-location reference signal of a CORESET satisfying a quasi co-location relationship with a reference signal in the beam failure detection reference signal set and included in each frequency domain bandwidth in the frequency domain bandwidth group where the beam failure frequency domain bandwidth is located is acquired according to the new reference signal indication information. For example, for each CORESET which is in each frequency domain bandwidth in the frequency domain bandwidth group and satisfies a quasi co-location relationship, with respect to a spatial Rx parameter, with a reference signal in the beam failure detection reference signal set, quasi co-location reference signals of these CORESETs are acquired according to the new reference signal indication information.

In solution 7, a quasi co-location reference signal of a CORESET included in the beam failure frequency domain bandwidth and used for acquiring a beam failure detection reference signal is acquired according to a new reference signal.

In solution 8, after a quasi co-location reference signal of CORESET(n) in the beam failure frequency domain bandwidth is updated, a quasi co-location reference signal of each CORESET that has the same index as CORESET(n) and is in the frequency domain bandwidth group where the beam failure frequency domain bandwidth is located is updated. That is, quasi co-location reference signals of CORESET (n)s in all frequency domain bandwidths in the frequency domain bandwidth group are updated. In an embodiment, the beam failure frequency domain bandwidth is frequency domain bandwidth 1, and a quasi co-location reference signal of CORESET(n) in frequency domain bandwidth 2 in the frequency domain bandwidth group is acquired according to a second reference signal in frequency domain bandwidth 2. Here the second reference signal corresponds to a new reference signal. For example, the TCI state ID where the second reference signal is located is the same as the TCI state ID where the new reference signal is located. Alternatively, the resource index of the second reference signal is the same as the resource index of the new reference signal. Alternatively, the difference between the resource index of the second reference signal and the resource index of the new reference signal is a predetermined value. Alternatively, a quasi co-location reference signal, associated with a spatial Rx parameter, of CORESET(n) in frequency domain bandwidth 2 is the new reference signal, and a quasi co-location reference signal, associated with a second-type quasi co-location parameter, of CORESET(n) in frequency domain bandwidth 2 is the second reference signal.

In solution 9, one or more CORESETs are selected from each CORESET group in the beam failure frequency domain bandwidth, and a quasi co-location reference signal of a selected CORESET is acquired according to a new reference signal.

In solution 10, one or more CORESETs are selected from each CORESET group in each frequency domain bandwidth in the frequency domain bandwidth group where the beam failure frequency domain bandwidth is located, and a quasi co-location reference signal of a selected CORESET is acquired according to a new reference signal.

In solution 11, a CORESET using a new reference signal is determined according to the method for determining a beam failure detection reference signal. For example, a beam failure detection reference signal satisfies a quasi co-location relationship only with a CORESET in one CORESET group, and then each CORESET using a new reference signal belongs to one CORESET group. The beam failure detection reference signal satisfies a quasi co-location relationship with CORESETs in more than one CORESET group, and then CORESETs using new reference signals are from more than one CORESET group. That is, quasi co-location reference signals of CORESETs in more than one CORESET group are acquired according to new reference signals. Alternatively, the beam failure detection reference signal satisfies a quasi co-location relationship with CORESETs in more than one CORESET group, then quasi co-location reference signals of all CORESETs in the frequency domain bandwidth are acquired according to new reference signals.

In solution 12, new reference signals in one beam frequency domain bandwidth include more than one reference signal. Different new reference signals correspond to different CORESET groups. A quasi co-location reference signal of a CORESET in each CORESET group is acquired according to a new reference signal corresponding to the CORESET group. The combination of more than one new reference signal may be configured by a base station.

In solution 13, a corresponding relationship between a reference signal in a candidate reference signal set and a CORESET is established according to signaling information and/or a predetermined rule. One candidate reference signal may correspond to more than one CORESET. Different candidate reference signals may correspond to different CORESETs. In the case where a terminal selects one candidate reference signal to serve as a new reference signal, a quasi co-location reference signal of a CORESET corresponding to the new reference signal is acquired according to the new reference signal.

In solution 14, a CORESET acquiring a quasi co-location relationship according to a new reference signal is determined according to whether the beam failure frequency domain bandwidth is a primary frequency domain bandwidth (for example, a special cell) or a secondary frequency domain bandwidth (for example, a secondary cell). For example, a CORESET included in the primary frequency domain bandwidth and acquiring a quasi co-location relationship according to a new reference signal includes a CORESET associated with a beam failure detection search space. The beam failure detection search space is configured through a high-layer signaling. a CORESET included in a secondary frequency domain bandwidth and acquiring a quasi co-location relationship according to a new reference signal includes a CORESET determined according to the preceding solutions 1 to 13.

The selection of any of the preceding solutions may be notified through a signaling to the terminal or may be predetermined by the base station and the terminal. Alternatively, the terminal is notified through the signaling information whether only a quasi co-location reference signal of a CORESET in the beam failure frequency domain bandwidth is acquired according to a new reference signal or a quasi co-location reference signal of a CORESET in each frequency domain bandwidth in the frequency domain bandwidth group where the beam failure frequency domain bandwidth is located is acquired according to a new reference signal.

The beam failure frequency domain bandwidth is configured with a beam failure recovery parameter.

Each frequency domain bandwidth of the frequency domain bandwidth group where the beam failure frequency domain bandwidth is located shares at least one piece of the following signaling information: a MAC-CE signaling for updating a TCI state of a PDSCH, an RRC signaling for configuring a TCI state of a PDSCH, a MAC-CE signaling for updating a TCI state of a CORESET, or an RRC signaling for configuring a TCI state of a CORESET.

Alternatively, when a frequency domain bandwidth is a BWP, the frequency domain bandwidth group where the beam failure frequency domain bandwidth is located includes all BWPs in one CC.

When method one of beam failure request information transmission is used, from a predetermined moment after a beam failure request is transmitted, a quasi co-location reference signal of an above-determined CORESET is determined according to a new reference signal. When method two of beam failure request information transmission is used, from a predetermined moment after the response information including the beam failure request information and transmitted in process two is received, a quasi co-location reference signal of an above-determined CORESET is determined according to a new reference signal.

In the case where a quasi co-location reference signal of a preceding CORESET is acquired according to a new reference signal, the quasi co-location reference signal of the PDSCH scheduled in the CORESET may also be acquired according to the new reference signal.

Similarly, an uplink channel and/or uplink signal whose spatial transmission filter parameter is acquired according to a spatial transmission filter transmitting the beam failure request information is determined according to a PUCCH resource group and/or a frequency domain bandwidth group. Alternatively, an uplink channel and/or uplink signal whose spatial transmission filter parameter is acquired according to a new reference signal is determined according to a PUCCH resource group and/or a frequency domain bandwidth group. The difference lies in that a CORESET in the preceding solutions is replaced with a PUCCH resource, that a preceding quasi co-location reference signal associated with a predetermined quasi co-location parameter is replaced with "a spatial transmission filter", and that a preceding new reference signal is replaced with "a spatial transmission filter transmitting the beam failure request information". Of course, a new reference signal can be kept unchanged. For example, as mentioned above, a spatial transmission filter parameter of a PUCCH is acquired according to a new reference signal. It is notified through a signaling whether only a PUCCH in the beam failure frequency domain bandwidth acquires a spatial transmission filter according to a new reference signal (or a spatial transmission filter of a signal including the beam failure request information) or a PUCCH is each frequency domain bandwidth in the frequency domain bandwidth group acquires a spatial transmission filter according to a new reference signal (or a spatial transmission filter of a signal including the beam failure request information).

Application Embodiment Seven

In this embodiment, PUCCHs with the same PUCCH group ID in one frequency domain bandwidth group share one MAC-CE. The MAC-CE includes one or more pieces of spatial relationship information (spatialrelation). The spatialrelation of each CC in the frequency domain bandwidth group serves as one of the one or more pieces of spatialrelation included in the MAC-CE.

It is notified through an RRC signaling or a MAC-CE signaling whether the spatialrelation of a PUCCH group is updated at the frequency domain bandwidth level or at the frequency domain bandwidth group level. A piece of spatial relation includes a downlink reference signal or an uplink reference signal. When a downlink reference signal is included, a spatial transmission filter of a PUCCH is acquired according to a spatial transmission filter receiving the downlink reference signal. When an uplink reference signal is included, a spatial transmission filter of a PUCCH is acquired according to a spatial transmission filter transmitting the uplink reference signal.

Application Embodiment Eight

In this embodiment, a corresponding relationship between third information and a beam failure recovery parameter is established. The third information includes one or more of a CORESET group or a frequency domain bandwidth group. The beam failure recovery parameter indicates one or more parameters configured or determined for a beam failure recovery process. For example, the beam failure recovery parameter includes at least one of the following parameters: a beam failure detection reference signal set, a candidate reference signal set, a new reference signal, a downlink channel and/or a downlink signal whose quasi co-location reference signal is acquired according to the new reference signal, an uplink channel and/or an uplink signal whose spatial transmission filter parameter is acquired according to the new reference signal, an uplink channel or an uplink signal whose spatial transmission filter information is acquired according to a spatial transmission filter of a channel or signal including beam failure request information, a beam failure detection counter, a beam failure request information transmission counter, a beam failure detection timer, a beam failure recovery timer, a monitoring timer, the channel or signal including the beam failure request information, a beam failure recovery control channel resource including monitoring beam failure response information, a CORESET satisfying a quasi co-location relationship with a beam failure detection reference signal, a beam failure recovery parameter of one frequency domain bandwidth, a priority corresponding to SR information of a resource request including the beam failure request information, or a parameter configured or determined for a beam failure recovery process. When a downlink channel is monitored in a beam failure recovery control resource, it indicates that the beam failure request information is transmitted successfully. A description is made hereinafter by taking an example of a corresponding relationship between a CORESET group and a beam failure recovery parameter.

A first implementation for determining a corresponding relationship between a CORESET group and a beam failure recovery parameter includes that each CORESET group corresponds to one set of beam failure recovery parameters. Each CORESET group corresponds to one beam failure recovery process. One or more of the following operations are performed independently: beam failure detection, beam failure request, or new beam information reporting indication (that is, new reference signal reporting). When beam failure requests of two CORESET groups collide with each other or new beam information reporting indications of two CORESET groups collide with each other, two pieces of request information or reporting information can be combined and reported, or only one of the two pieces of request information or reporting information is reported. Alternatively, when a beam failure request of one CORESET group and a new beam information report of the other CORESET group collide with each other, the request information and the reporting information can be combined and reported, or only one of the request information and the reporting information is reported.

A second implementation for determining a corresponding relationship between a CORESET group and a beam failure recovery parameter includes that multiple CORESET groups of one frequency domain bandwidth correspond to one beam failure recovery process.

At least one CORESET in each CORESET group included in the beam failure detection reference signal set satisfies a quasi co-location relationship with or corresponds to at least one reference signal in the beam failure detection reference signal set. When a terminal detects beam failure, it indicates that beam failure occurs in all CORESET groups. The terminal selects a new reference signal for each CORESET group. From a predetermined moment after the beam failure request information is transmitted, or from a predetermined moment after the response information of the beam failure request information is received, each CORESET group acquires a quasi co-location reference signal of one or more CORESETs in the CORESET group according to a corresponding reference signal.

A corresponding relationship between a candidate reference signal set and a CORESET group is established.

Multiple new reference signals included in the beam failure request information are from multiple candidate reference signal sets corresponding to multiple CORESET groups.

Application Embodiment Nine

In this embodiment, the relationship between two types of frequency domain bandwidth groups is determined. The two types of frequency domain bandwidth groups include a first-type frequency domain bandwidth group and a second-type frequency domain bandwidth group. The first-type frequency domain bandwidth group shares a MAC-CE signaling for activating or updating a TCI state of a PDSCH. The second-type frequency domain bandwidth group shares a MAC-CE signaling for activating or updating a TCI state of a CORESET.

The relationship between the two types of frequency domain bandwidth groups includes one of the following: The two types of frequency domain bandwidth groups have the same group division, or group divisions of the two types of frequency domain bandwidth groups are independent of each other.

For example, one master cell group (MCG) (or secondary cell group (SCG)) includes eight CCs. The two types of frequency domain bandwidths may belong to the same division, for example, a division into two CC groups. In this case, CC group 1 includes {CC1, CC2, CCS, CC6, CC7}. CC group 2 includes {CC3, CC4, CC8}. CCs in CC group i share both a signaling for activating or updating a TCI state ID of a PDSCH and a signaling for activating or updating a TCI state ID of a CORESET. However, in this case, if CC4 does not have a CORESET but has a PDSCH, CC4 ignores the signaling for CC group 2 and for activating or updating a TCI state ID of a CORESET. Alternatively, the second-type frequency domain bandwidth group is constituted by each CC with a CORESET in the first-type frequency domain bandwidth group. Alternatively, the second-type frequency domain bandwidth group is constituted by each CC of each frequency domain bandwidth with a predetermined CORESET ID in the first-type frequency domain bandwidth group.

For example, one master cell group (MCG) (or secondary cell group (SCG)) includes eight CCs. The two types of frequency domain bandwidths may be divided independently. For example, the first-type frequency domain bandwidth group includes two CC groups, with CC group 1 including {CC1, CC2, CCS, CC6, CC7} and CC group 1 including {CC3, CC4, CC8}; the second-type frequency domain bandwidth group includes two CC groups, with CC group 1 including {CC1, CC8} and CC group 2 including {CC2, CC3, CC4, CCS, CC6, CC7}. The division of the first-type frequency domain bandwidth group and the second-type frequency domain bandwidth group are obtained according to different pieces of signaling information and/or different predetermined rules. That is, each CC includes two frequency domain bandwidth group indexes. A first frequency domain bandwidth group index of a CC indicates the index of the first-type frequency domain bandwidth group to which the CC belongs, and a second frequency domain bandwidth group index of the CC indicates the index of the second-type frequency domain bandwidth group to which the CC belongs.

Application Embodiment Ten

In this embodiment, the same CORESET ID in one frequency domain bandwidth group shares a MAC-CE for activating or updating a TCI state ID. CCs in one MCG or SCG are divided into two groups through an RRC signaling. The same CORESET ID in each CC group shares a MAC-CE for activating or updating a TCI state ID. However, different frequency domain bandwidths in one frequency domain bandwidth group (that is, the CC group) include different numbers of CORESETs. For example, {CC1 to CC8} in one frequency domain bandwidth group each include CORESET-1, but only {CC1 to CC4} each include CORESET-2. Accordingly, when a MAC-CE updates a TCI state ID of each CORESET-2 for {CC1 to CC8}, frequency domain bandwidths with no CORESET-2 and in {CC1 to CC8} ignore this information. Alternatively, it is considered that this MAC-CE signaling is only suitable for frequency domain bandwidths {CC1 to CC4} with CORESET-2s and in {CC1 to CC8}. That is, MAC-CE signalings corresponding to different CORESET IDs are suitable for different frequency domain bandwidth groups.

Application Embodiment Eleven

In this embodiment, a frequency domain bandwidth group shares a MAC-CE signaling for activating or updating a TCI state ID of a PDSCH. One frequency domain bandwidth is only in one frequency domain bandwidth group. In another aspect, the MAC-CE signaling can also activate or update a TCI state ID of a PDSCH for each frequency domain bandwidth. Each MAC-CE signaling starts with a logical channel identifier (LCID). LCIDs are used for distinguishing different MAC-CE types. A first-type MAC-CE signaling for activating or updating a TCI state ID of a PDSCH at the frequency domain bandwidth level needs to share a MAC-CE identifier with a second-type MAC-CE signaling for activating or updating a TCI state ID of a PDSCH at the frequency domain bandwidth group level. For example, an LCID is 53. When a terminal receives a MAC-CE with the LCID of 53, the terminal needs to know whether a TCI state ID of a PDSCH is activated or updated at the frequency domain bandwidth group level or a TCI state ID of a PDSCH is activated or updated at the frequency domain bandwidth level.

In a first solution, an RRC signaling includes a division signaling of a frequency domain bandwidth group; and/or more than one frequency domain bandwidth groups are included, for example, each CC includes a frequency domain bandwidth group index. For one CC configured with no frequency domain bandwidth group, the frequency domain bandwidth group index is considered to be 0. In this case, the MAC-CE signaling with the LCID of 53 activates or updates a TCI state ID of a PDSCH at the frequency domain bandwidth group level. A frequency domain bandwidth group corresponding to the MAC-CE signaling is a frequency domain bandwidth group where a frequency domain bandwidth indicated in the MAC-CE is located. Otherwise, a TCI state ID of a PDSCH is activated or updated at the frequency domain bandwidth level. One frequency domain bandwidth belongs to only one frequency domain bandwidth group.

In a second solution, in the MAC-CE signaling (or an RRC signaling or another signaling) with the LCID of 53, one bit indicates whether a TCI state ID of a PDSCH is activated or updated at the frequency domain bandwidth group level or a TCI state ID of a PDSCH is activated or updated at the frequency domain bandwidth level.

A first-type MAC-CE signaling for activating or updating a TCI state ID of a CORSET at the frequency domain bandwidth level shares an LCID (for example, 52) with a second-type MAC-CE signaling for activating or updating a TCI state ID of a CORSET at the frequency domain bandwidth group level, which may also be determined according to one of the preceding first solution or the preceding second solution.

A first-type MAC-CE signaling for activating or updating the spatial relationship information of a PUCCH at the frequency domain bandwidth level shares an LCID (for example, 49) with a second-type MAC-CE signaling for activating or updating the spatial relationship information of a PUCCH at the frequency domain bandwidth group level. The two types of MAC signalings may also be distinguished according to one of the preceding first solution or the preceding second solution.

A first-type MAC-CE signaling for activating or updating the spatial relationship information of a PUCCH resource group at the frequency domain bandwidth level shares an LCID (for example, 49) with a second-type MAC-CE signaling for activating or updating the spatial relationship information of a PUCCH resource group at the frequency domain bandwidth group level. The two types of MAC signalings may also be distinguished according to one of the preceding first solution or the preceding second solution. For example, in the case where the spatial relationship information of a PUCCH resource group is activated or updated at the frequency domain bandwidth group level, the spatial relationship information of each resource group including a PUCCH, with a predetermined PUCCH resource group index, in each frequency domain bandwidth in a frequency domain bandwidth group is updated and is the same. The predetermined PUCCH resource group index is included in the MAC-CE. Alternatively, the predetermined PUCCH resource group index indicates a PUCCH resource group where a PUCCH resource carried in the MAC-CE signaling is located.

A first-type MAC-CE for activating or updating the spatial relationship information of a PUCCH at the PUCCH resource group level shares an LCID (for example, 49) with a second-type MAC-CE for activating or updating the spatial relationship information of a PUCCH at the PUCCH resource level. The two types of MAC signalings have the same LCID. It is determined through one of the solutions below whether a MAC-CE with the LCID of 49 corresponds to one PUCCH resource group or one PUCCH resource.

In solution 1, if a high-layer signaling includes the division information of a PUCCH resource group, for example, if an RRC signaling configures PUCCH resource group index information for each PUCCH resource, the MAC-CE signaling corresponds to one PUCCH resource group. The PUCCH resource group corresponding to the MAC-CE signaling is a PUCCH resource group where a PUCCH resource indicated in the MAC-CE signaling is located. Alternatively, the indication information of a PUCCH resource of a predetermined item (for example, a first item) and in the PUCCH resource group corresponding to the MAC-CE signaling is included in the MAC-CE signaling. Optionally, one PUCCH resource is included in only one PUCCH resource group.

In solution 2, the MAC-CE signaling includes 1-bit signaling indication information (or an RRC signaling or another signaling). The signaling indication information indicates whether the MAC-CE corresponds to one PUCCH resource group or one PUCCH resource. If the MAC-CE corresponds to one PUCCH resource, one or more pieces of spatial relationship information included in the MAC-CE is the spatial relationship of one PUCCH resource. If the MAC-CE corresponds to one PUCCH resource group, spatial relationship of all PUCCH resources in the one PUCCH resource group are updated according to the one or more pieces of spatial relationship information included in the MAC-CE, that is, PUCCHs in a PUCCH resource group share spatial relationship information.

Application Embodiment Twelve

In this embodiment, a PUCCH group is configured with a spatialrelation list through an RRC signaling. One or more pieces of spatialrelation are activated for the PUCCH group through a MAC-CE signaling. A spatial transmission filter of a PUCCH in the PUCCH group is acquired according to the activated one or more pieces of spatialrelation. One piece of spatialrelation includes a downlink reference signal or an uplink reference signal. When one piece of spatialrelation includes a downlink reference signal, a spatial transmission filter of the PUCCH group is acquired according to a receiving filter of the downlink reference signal. When one piece of spatialrelation includes an uplink reference signal, a spatial transmission filter of the PUCCH group is acquired according to a spatial transmission filter of the uplink reference signal.

Application Embodiment Thirteen

In this embodiment, one CORESET is associated with more than one TCI state. Each quasi co-location parameter of the same type has a corresponding quasi co-location reference signal in each TCI state. As shown in Table 2, CORESET1 corresponds to more than one TCI state, that is, TCI state 3 and TCI state 8.

TABLE 2

| One CORESET associated with two TCI states | | |
|---|---|---|
| | Quasi Co-Location Type A (QCL-TypeA) | QCL-TypeD |
| TCI state 3 | Channel state information- reference signal 1 (CSI-RS1) | CSI-RS3 |
| TCI state 8 | CSI-RS5 | SSB1 |

A QCL-TypeA includes a quasi co-location parameter, including a Doppler shift, a Doppler spread, an average delay, or an average spread. A QCL-TypeD includes a spatial Rx parameter. The preceding association of one CORESET with two TCI states may be also referred to as that two TCI states are activated by one CORESET. For example, different TCI states corresponding to different DMRS port groups of CORESET1, different frequency domain resource groups of CORESET1, different time domain resource groups of CORESET1, or different search space sets of CORESET1.

If a beam failure detection reference signal is acquired according to a quasi co-location reference signal, associated with a spatial Rx parameter, of CORESET1, quasi co-location reference signals which are used for acquired beam failure detection reference signals and are associated with spatial Rx parameters and in TCI states among multiple TCI states need to be determined. One of the solutions below can be used.

In solution 1, a beam failure detection reference signal is acquired according to a quasi co-location reference signal associated with a spatial Rx parameter and in one TCI state (that is, n is equal to 1) in m TCI states of one CORESET or is acquired according to one quasi co-location reference signal among multiple quasi co-location reference signals associated with spatial Rx parameters.

According to fourth information, one TCI state is selected from multiple TCI states. Alternatively, one quasi co-location reference signal is selected from multiple quasi co-location reference signals associated with spatial Rx parameters. Different pieces of fourth information correspond to different preceding TCI states or different preceding quasi co-location reference signals. A piece of fourth information includes at least one of the following: a DMRS port group, a frequency domain resource group, a time domain resource group, a search space set, a TCI state, or a quasi co-location reference signal. For example, a TCI state or quasi co-location reference signal corresponding to the piece of fourth information with the lowest index is selected.

In solution 2, n beam failure detection reference signals are acquired according to m quasi co-location reference signal associated with spatial Rx parameters and in m TCI states of one CORESET. Alternatively, m beam failure detection reference signals are acquired according to m quasi co-location reference signal associated with spatial Rx parameters. That is, one CORESET can acquire more than one beam failure detection reference signal.

When a quasi co-location reference signal of a CORESET is according to a new reference signal, if the number p of new reference signals is not equal to the number m of TCI states of the CORESET or the number m of quasi co-location reference signals associated with parameters of the same type, the method for acquiring a quasi co-location reference signal of the CORESET according to a new reference signal needs to be determined. For example, p is smaller than m. For example, p=1, and m=2. In this case, the solutions are as below.

In solution 1, one TCI state in the CORESET is acquired according to the new reference signal, and the other TCI state of the CORESET is not updated and is kept unchanged. It may also be referred to that q quasi co-location reference signals in m quasi co-location reference signals, associated with parameters of the same type, of the CORESET are acquired according to the new reference signal while another quasi co-location reference signal is kept unchanged.

In solution 2, all TCI states of the CORESET are acquired according to the new reference signal. That is, q=m.

Application Embodiment Fourteen

In this embodiment, in the case where the interval between a PDSCH and a PDCCH scheduling the PDSCH is smaller than a predetermined value timeDurationForQCL, a quasi co-location parameter of the PDSCH is referred to as a default quasi co-location parameter of the PDSCH. For example, a default quasi co-location parameter of the PDSCH is determined according to a quasi co-location parameter, where the quasi-co parameter is of a CORESET with the lowest CORESET index in the slot including the CORESET and latest to the PDSCH.

However, when the maximum number of PDSCH-associated quasi co-location reference signals of quasi co-location parameters of the same type is greater than 1, the number of sets of default quasi co-location parameters of the PDSCH needs to be determined.

Accordingly, one solution is that the number of sets of default quasi co-location parameters of the PDSCH is determined according to the scheme information of the PDSCH. Five types of schemes of the PDSCH are included as follows: space division multiplexing (SDX), frequency division multiplexing (FDM)-A, FDM-B, time division multiplexing (TDM)-A, and TDM-B.

As for the SDM, one PDSCH is associated with two DMRS port groups, and each port group corresponds to one TCI state. As for the FDM-A, one PDSCH in a frequency domain includes two frequency domain resource groups; the two frequency domain resource groups are each associated with one TCI state; the intersection between the two frequency domain resource groups is empty; and the PDSCH is associated with the same DMRS port number on multiple frequency domain resource groups. As for the FDM-B, one PDSCH is transmitted repeatedly in two frequency domain resource groups; the two frequency domain resource groups are each associated with one TCI state; the intersection between the two frequency domain resource groups is empty; each frequency domain resource group corresponds to one repeated transmission of the PDSCH; and PDSCH is associated with the same DMRS port number on multiple frequency domain resource groups. As for the TDM-A, one PDSCH is transmitted repeatedly in one or two time domain resource groups; two time domain resource groups are each associated with one TCI state; the intersection between the two time domain resource groups is empty; each time domain resource group corresponds to one repeated transmission of the PDSCH; the two time domain resource groups are included in one slot; the PDSCH is associated with the same DMRS port number on multiple frequency domain resource groups; and it is determined according to the number of TCI states whether one or two transmissions are included in the slot. As for the TDM-B, one PDSCH is transmitted repeatedly in multiple time domain resource groups; the time domain resource groups are divided into two types; each type is associated with one TCI state; different time domain resource groups are in different slots; each frequency domain resource group corresponds to one repeated transmission of the PDSCH; and the PDSCH is associated with the same DMRS port number on multiple frequency domain resource groups.

It can be seen from the preceding description that in the SDM, FDM-A, and FDM-B, a terminal needs to acknowledge two TCI states, that is, two sets of quasi co-location parameters, on the same time domain symbol. In the TDM-A and TDM-B, the terminal needs to acknowledge only one TCI state, that is, one set of quasi co-location parameters, on the same time domain symbol.

Accordingly, when an RRC configures that a scheme of the PDSCH is one of the TDM-A or the TDM-B, only one set of default quasi co-location parameters is included. When the RRC configures that a scheme of the PDSCH is one of the SDM, the FDM-A, or the FDM-B, at most two sets of default quasi co-location parameters are included.

In another aspect, the terminal reports the maximum number of TCI states that can be received at the same moment (such maximum number may also be referred to as the maximum number of spatial Rx parameters of different channels or signals at the same moment or the maximum number of quasi co-location reference signals, associated with spatial Rx parameters, of different channels or signals at the same moment). A PDSCH scheme is determined according to the capacity information reported by the terminal. When the terminal reports that the number of TCI states that can be received at the same moment is 1, schedulable PDSCH schemes include {TDM-A, TDM-B}. When the terminal reports that the number of TCI states that can be received at the same moment is 2, schedulable PDSCH schemes include {TDM-A, TDM-B, SDM, FDM- A, FDM-B}. The capacity information is the capacity information of one frequency domain bandwidth or the capacity information of one band.

Application Embodiment Fifteen

In this embodiment, SRs associated with logical channels have two priorities. It is configured according to an RRC signaling whether each SR corresponds to a first priority (referred to as SR-1 hereinafter) or a second priority (referred to as SR-2 hereinafter). Hybrid automatic repeat request acknowledgements (HARQ-ACK) also have two priorities. Channel state information (CSI) also has two priorities. An SR, an HARQ-ACK, and a piece of CSI which have the same priority can be multiplexed into the same uplink channel or the same uplink signal for transmission. After an SR, an HARQ-ACK, and a piece of CSI which have the first priority collide with an SR, an HARQ-ACK, and a piece of CSI which have the second priority, the SR, the HARQ-ACK, and the piece of CSI which have the second priority can be abandoned.

It needs to be determined that when method two is used for transmitting beam failure request information, an SR transmitted in process one is included, which is hereinafter referred to as the relationship between SR-beam failure recovery (BFR) and the preceding SRs corresponding to two types of priorities. Accordingly, at least one of the solutions below may be used.

In solution 1, SR-1 and BFR-SR are each a first priority, and SR-2 is a second priority.

In solution 2, SR-1 is a first priority, and BFR-SR and SR-2 are each a second priority.

In solution 3, it is configured in BFR-SR the priority of BFR-SR between a first priority and a second priority.

In solution 4, when SR-1, SR-2, and BFR-SR collide with each other or need to be combined into one channel or signal, value sets to which values of SR-1, SR-2, and BFR-SR belong need to be determined. One value set corresponds to one state value. One value set includes one or more values. Different states need to be notified to a base station. When PUCCH resources of SR-1, SR-2, and BFR-SR includes PUCCH format0 and/or PUCCH format1, for example, not including PUCCH format2 or PUCCH format3, different state values are indicated by resources where state values are transmitted and which belong to the preceding three SR resources; alternatively, different state values are indicated by different mapping relationships between information values of the HARQ-ACK and SR-PUCCH resource sequence parameters.

As shown in Table 3, three value sets are divided to correspond to three states. SR-1 positive and BFR-SR positive are not distinguished from each other. That is, when the base station receives state 1, the terminal does not know whether one or more of SR-1 or BFR-SR is positive. Alternatively, as shown in Table 4, four value sets are divided to correspond to four states. SR-enhanced Ultra-Reliable and Low Latency Communications (eURLLC) positive and PUCCH-BFR positive are distinguished from each other. Alternatively, as shown in Table 5, five value sets are divided to correspond to five states.

TABLE 3

| Value Set | Value | SR-2 | SR-1 | BFR-SR |
| --- | --- | --- | --- | --- |
| Set 0 | 0 | negative | negative | negative |
| Set 1 | 1 | negative | negative | positive |
| Set 1 | 2 | negative | positive | negative |
| Set 1 | 3 | negative | positive | positive |
| Set 2 | 4 | positive | negative | negative |
| Set 1 | 5 | positive | negative | positive |
| Set 1 | 6 | positive | positive | negative |
| Set 1 | 7 | positive | positive | positive |

TABLE 4

| Value Set | Value | SR-2 | SR-1 | BFR-SR |
| --- | --- | --- | --- | --- |
| Set 0 | 0 | negative | negative | negative |
| Set 1 | 1 | negative | negative | positive |
| Set 2 | 2 | negative | positive | negative |
| Set 1 | 3 | negative | positive | positive |
| Set 3 | 4 | positive | negative | negative |
| Set 1 | 5 | positive | negative | positive |
| Set 2 | 6 | positive | positive | negative |
| Set 1 | 7 | positive | positive | positive |

TABLE 5

| Value Set | Value | SR-2 | SR-1 | BFR-SR |
| --- | --- | --- | --- | --- |
| Set 0 | 0 | negative | negative | negative |
| Set 1 | 1 | negative | negative | positive |
| Set 2 | 2 | negative | positive | negative |
| Set 3 | 3 | negative | positive | positive |
| Set 4 | 4 | positive | negative | negative |
| Set 1 | 5 | positive | negative | positive |
| Set 2 | 6 | positive | positive | negative |
| Set 3 | 7 | positive | positive | positive |

This embodiment further provides an information determination apparatus. FIG. 4 is a diagram illustrating the structure of an information determination apparatus according to the present application. As shown in FIG. 4, the information determination apparatus provided in embodiments of the present application can be integrated on a UE. The apparatus includes an information determination module 320.

The information determination module 320 is configured to determine second information according to first information. The first information includes at least one of the following: a time domain parameter of a search space, a CORESET group, a CORESET set, the number of CORESETs, the number of frequency domain bandwidths, a frequency domain bandwidth group, a PUCCH resource group, a first-type beam failure recovery parameter, signaling information, or a predetermined rule. The second information includes at least one of the following: a second-type beam failure recovery parameter, a radio link reference signal, a frequency domain bandwidth corresponding to a MAC-CE signaling, a PUCCH resource corresponding to the MAC-CE signaling, or a quasi co-location parameter of a downlink channel or a downlink signal.

The preceding technical solutions are provided for the case of a large number of CORESETs or frequency domain bandwidths so as to solve the problem of how to reduce the complexity of terminal detection, to perform beam failure recovery rapidly, and to improve the robustness of a link.

The information determination module 320 includes a first-type CORESET determination unit and a second information determination unit. The first-type CORESET determination unit is configured to determine the first-type CORESET according to the first information. The second information determination unit is configured to determine the second information according to the first-type CORESET. The first-type CORESET includes at most A CORESETs. Alternatively, the first-type CORESET includes at most A CORESET sets. A is a positive integer greater than or equal to 1.

The first-type CORESET determination unit is specifically configured to perform one of the processes below.

The first-type CORESET is determined according to a CORESET in a target CORESET group. The first-type CORESET is constituted by one CORESET selected from each CORESET group. The first-type CORESET is determined according to a sequence of first keeping the priority of each CORESET in each CORESET group unchanged and each CORESET group index in ascending order and then keeping the priority of each CORESET in each CORESET group in descending order. The first-type CORESET is determined according to a sequence of keeping each CORESET group index unchanged and the priority of each CORESET in each CORESET group in descending order and then keeping each CORESET group index in ascending order. The first-type CORESET is determined according to a time domain parameter of a search space associated with a CORESET. The first-type CORESET is determined according to a CORESET in one frequency domain bandwidth in one frequency domain bandwidth group. The first-type CORESET is determined according to a CORESET in one frequency domain bandwidth in one frequency domain bandwidth group and with the frequency domain bandwidth index satisfying a predetermined feature. The first-type CORESET is determined according to a CORESET in a frequency domain bandwidth with the frequency domain bandwidth index satisfying a predetermined feature. The first-type CORESET is determined according to a beam failure detection reference signal. The first-type CORESET is acquired according to a CORESET corresponding to a new reference signal. A corresponding relationship between the new reference signal and the CORESET is acquired through signaling information. The first-type CORESET is determined according to whether a frequency domain bandwidth is a primary frequency domain bandwidth.

The first-type CORESET determination unit is specifically configured to, in the case of determining the first-type CORESET according to the CORESET in the target CORESET group, cause the target CORESET group to satisfy at least one of the features below.

The target CORESET group has the highest priority among CORESET groups. The CORESET group index of the target CORESET group satisfies a predetermined feature. The target CORESET group includes a CORESET associated with a search space whose time domain parameter satisfies a predetermined feature. The target CORESET group is acquired according to the received signaling information. Among the CORESET groups, the target CORESET group includes the largest number of CORESETs. Among the CORESET groups, the target CORESET group includes the largest number of CORESET sets. The target CORESET group includes a CORESET with the CORESET index satisfying a predetermined feature. Among the CORESET groups, the target CORESET group includes the largest number of CORESETs associated with search spaces whose time domain parameters satisfy a predetermined feature. Among the CORESET groups, the target CORESET group includes the largest number of CORESET sets associated with search spaces whose time domain parameters satisfy a predetermined feature. One CORESET group is included in the target CORESET group.

The first-type CORESET determination unit is specifically configured to, in the case of determining the first-type CORESET according to the CORESET in the target CORESET group, determine the target CORESET group to satisfy at least one of the following: a CORESET group index, a time domain parameter of a search space associated with a CORESET included in a CORESET group, the number of CORESETs included in a CORESET group, the number of CORESET sets included in a CORESET group, or the index of a CORESET included in a CORESET group.

The second information includes a reference signal set. The reference signal set includes at least one of the following reference signal sets: a beam failure detection reference signal set, a radio link detection reference signal set, or a new reference signal set. The reference signal set includes at most A reference signals. A is a positive integer greater than or equal to 1.

A is associated with at least one of the following: the number of CORESET groups, the number of CORESETs, reported capacity information, the number of frequency domain bandwidth groups, or the maximum number of SSBs.

The first-type CORESET determination unit is specifically configured to determine the first-type CORESET in a second-type CORESET. The second-type CORESET is constituted by one CORESET selected from each CORESET set or by a CORESET in one frequency domain bandwidth.

The first-type CORESET determination unit is specifically configured to perform at least one of the processes below.

The first-type CORESET is determined in the second-type CORESET according to the first information. In the case where the number of CORESETs in the second-type CORESET is greater than A, the first-type CORESET is determined according to the first information. In the case where the number of CORESETs in the second-type CORESET is less than or equal to A, the second-type CORESET is included in the first-type CORESET.

The first-type CORESET determination unit is specifically configured to determine the first-type CORESET in one CORESET group or in a CORESET included in one frequency domain bandwidth according to a time domain parameter of a search space associated with the CORESET. The time domain parameter of the search space includes at least one of the following: the period of the search space, monitoring occasions of the search space in one slot, monitoring occasions of the search space in one period, or the number of slots for which one monitoring occasion of the search space lasts.

The first-type CORESET includes A CORESETs. A search spaces associated with the A CORESETs satisfy one of the features below.

The A search spaces have the shortest periods. The A search spaces have the largest numbers of monitoring occasions in one slot. The A search spaces have the largest numbers of slots for which one monitoring occasion lasts. The A search spaces have the highest time domain density. The time domain density is determined according to time domain parameters.

The time domain density is determined according to one of the following: a first quotient or a second quotient.

The first quotient is equal to a quotient of a first product and the period of a search space. The first product is equal to a product of monitoring occasions of the search space in one slot and the number of slots for which one monitoring occasion of the search space lasts. The second quotient is equal to a quotient of the number of monitoring occasions of a search space in one slot and the period of the search space.

The second information determination unit is configured to perform at least one of the processes below.

A beam failure detection reference signal is determined according to the first-type CORESET. A radio link detection reference signal is determined according to the first-type CORESET. A downlink channel or a downlink signal whose quasi co-location reference signal is determined according to a new reference signal is determined according to the first-type CORESET. An uplink channel or an uplink signal is determined according to the first-type CORESET; here a spatial transmission filter of the uplink channel or signal is determined according to a new reference signal. An uplink channel or an uplink signal is determined according to the first-type CORESET; here a spatial transmission filter of the uplink channel or an uplink signal is determined according to the channel and/or signal including the beam failure request information. A CORESET satisfying a quasi co-location relationship with a beam failure detection reference signal is determined according to the first-type CORESET. A CORESET satisfying a quasi co-location relationship with a radio link detection reference signal is determined according to the first-type CORESET.

In the case of determining the first-type CORESET according to the first information and determining the second information according to the first-type CORESET, at least one of the processes below is included.

n beam failure detection reference signals are acquired according to n quasi co-location reference signals in m quasi co-location reference signals of one CORESET; here the m quasi co-location reference signals are each associated with a spatial Rx parameter, and m and n are each a positive integer greater than or equal to 1. Quasi co-location reference signals corresponding to q resource groups in m resource groups of one CORESET are acquired according to p new reference signals; here p and q are each a positive integer greater than or equal to 1. The CORESET here belongs to the first-type CORESET. One CORESET is associated with m resource groups. Each resource group corresponds to one quasi co-location reference signal set.

The downlink channel or the downlink signal whose quasi co-location reference signal according to the new reference signal is determined according to the first-type CORESET, a quasi co-location reference signal of a CORESET not belonging to the first-type CORESET and in one frequency domain bandwidth is not updated according to the new reference signal, and/or a quasi co-location reference signal of a CORESET belonging to the first-type CORESET and in one frequency domain bandwidth is updated according to the new reference signal.

The information determination module is configured to perform at least one of the processes below.

In the case where the number of frequency domain bandwidths is greater than a first predetermined value, the second information is determined according to the first information. In the case where the number of frequency domain bandwidths configured with the second information is greater than a second predetermined value, the second information is determined according to the first information. In the case where the total number of first-type reference signals in the frequency domain bandwidth group is greater than a third predetermined value, the second information is determined according to the first information. In the case where the total number of first-type reference signals in the frequency domain bandwidth group is greater than a fourth predetermined value in a predetermined time segment, the second information is determined according to the first information. Here a first-type reference signal includes at least one of the following: a beam failure detection reference signal, a radio link detection reference signal, or a new reference signal.

In the case where the first information includes signaling information and/or a frequency domain bandwidth group and the second information includes a beam failure recovery parameter, the information determination module is configured to perform at least one of the processes below.

From a first moment, a quasi co-location reference signal of a predetermined downlink channel and/or downlink signal in a second frequency domain bandwidth is acquired according to a second reference signal; here the second reference signal corresponds to a new reference signal of a first frequency domain bandwidth, and the first frequency domain bandwidth and the second frequency domain bandwidth belong to the same frequency domain bandwidth group. From a second moment, a spatial transmission filter of a predetermined uplink channel and/or uplink signal in the second frequency domain is acquired according to the new reference signal of the first frequency domain bandwidth; here the first frequency domain bandwidth and the second frequency domain bandwidth belong to the same frequency domain bandwidth group. From a third moment, a quasi co-location reference signal of a predetermined downlink channel and/or downlink signal in each frequency domain bandwidth in the frequency domain bandwidth group is acquired according to the second reference signal; here the second reference signal corresponds to the new reference signal of the first frequency domain bandwidth, and the frequency domain bandwidth group includes the first frequency domain bandwidth. From a fourth moment, a spatial transmission filter of a predetermined uplink channel and/or uplink signal in each frequency domain bandwidth in the frequency domain bandwidth group is acquired according to the new reference signal of the first frequency domain bandwidth; here the frequency domain bandwidth group includes the first frequency domain bandwidth. From a fifth moment, in the case where a quasi co-location reference signal of a CORESET in the first frequency domain bandwidth is acquired according to the new reference signal of the first frequency domain bandwidth, a quasi co-location reference signal of a CORESET in the second frequency domain bandwidth is acquired according to the second reference signal; here the second reference signal corresponds to the new reference signal of the first frequency domain bandwidth, the first frequency domain bandwidth and the second frequency domain bandwidth belong to the same frequency domain bandwidth group, and the CORESET index of the CORESET in the first frequency domain bandwidth is the same as the CORESET index of the CORESET in the second frequency domain bandwidth. It is determined according to the signaling information whether, from the first moment, only the quasi co-location reference signal of the CORESET in the first frequency domain bandwidth is acquired according to the new reference signal or a quasi co-location reference signal of a CORESET in each frequency domain bandwidth in the frequency domain bandwidth group where the first frequency domain bandwidth is located is acquired according to the second reference signal.

A predetermined downlink channel includes at least one of the following channels: the first-type CORESET or a downlink channel scheduled by a PDCCH in the first-type CORESET. The first-type CORESET is determined according to the first information.

At least one of the features below is included.

The new reference signal is in the first frequency domain bandwidth. The second reference signal is in the second frequency domain bandwidth. The second reference signal is associated with a quasi co-location reference signal of a predetermined type. The second reference signal and a predetermined downlink channel and/or downlink signal are in the same frequency domain bandwidth. The difference between the index of a transmission configuration indication (TCI) state where the second reference signal is located and the index of a TCI state where the new reference signal is located is fixed. The difference between the index of a resource where the second reference signal is located and the index of a resource where the new reference signal is located is fixed. The second reference signal is the new reference signal in the first frequency domain bandwidth. In the case where the first frequency domain bandwidth and a predetermined downlink channel and/or downlink signal are in the same serving cell, the second reference signal is the new reference signal in the first frequency domain bandwidth.

The information determination module is configured to perform at least one of the processes below.

A frequency domain bandwidth corresponding to a first-type MAC-CE signaling is determined according to a predetermined rule; here the predetermined rule includes that in the case where an RRC signaling is configured with a frequency domain bandwidth group, the frequency domain bandwidth corresponding to the MAC-CE signaling includes the frequency domain bandwidth group or a frequency domain bandwidth group where a frequency domain bandwidth corresponding to a frequency domain bandwidth index carried in the MAC-CE signaling is located. A frequency domain bandwidth corresponding to a first-type MAC-CE signaling is determined according to a predetermined rule; here the predetermined rule includes that in the case where an RRC signaling is configured with no frequency domain bandwidth group, the frequency domain bandwidth corresponding to the MAC-CE signaling includes a frequency domain bandwidth corresponding to a frequency domain bandwidth index carried in the MAC-CE signaling. A PUCCH corresponding to a MAC-CE signaling for activating or updating PUCCH spatial relationship information is determined according to a predetermined rule; here the predetermined rule includes that in the case where an RRC signaling is configured with a PUCCH group, the PUCCH corresponding to the MAC-CE signaling includes the PUCCH group or a PUCCH group where a PUCCH resource corresponding to a PUCCH resource index carried in the MAC-CE signaling is located. A PUCCH corresponding to a MAC-CE signaling for activating or updating PUCCH spatial relationship information is determined according to a predetermined rule; here the predetermined rule includes that in the case where no PUCCH group is configured, the PUCCH corresponding to the MAC-CE signaling includes a PUCCH resource corresponding to a PUCCH resource index carried in the MAC-CE signaling. It is determined according to signaling information whether a first-type MAC-CE signaling corresponds to a frequency domain bandwidth or a frequency domain bandwidth group. It is determined according to signaling information whether a first-type MAC-CE signaling corresponds to a PUCCH resource or a PUCCH resource group. The spatial relationship information of a PUCCH resource, with a predetermined PUCCH resource group index, in each frequency domain bandwidth in a frequency domain bandwidth group is activated or updated according to a MAC-CE signaling.

A frequency domain bandwidth group satisfies at least one of the features below.

The division of the frequency domain bandwidth group is determined according to the signaling information. One master cell group (MCG) includes one or more frequency domain bandwidth groups. One secondary cell group (SCG) includes one or more frequency domain bandwidth groups. The frequency domain bandwidth group shares a high-layer signaling for activating or updating a TCI state ID of a PDSCH. CORESETs with the same CORESET index in the frequency domain bandwidth group share the high-layer signaling for activating or updating a TCI state ID of a PDSCH. The frequency domain bandwidth group shares a high-layer signaling for activating or updating the spatial relationship information of a PUCCH. The frequency domain bandwidth group shares a high-layer signaling for activating or updating the spatial relationship information of a PUCCH resource group. The frequency domain bandwidth group includes a BWP in one serving cell.

The information determination module is configured to perform the process below.

From a sixth moment, a quasi co-location reference signal of a CORESET in a CORESET group is acquired according to a new reference signal corresponding to the CORESET group. Each new reference signal corresponds to one CORESET group. The new reference signal reporting information of one frequency domain bandwidth includes the indication information of more than one new reference signal. Each of the more than one new reference signal corresponds to one CORESET group.

The information determination module is configured to perform the processes below.

At least one of the following is acquired according to a beam failure detection reference signal set: a predetermined downlink channel and/or downlink signal for determining a quasi co-location reference signal according to a new reference signal, an uplink channel or uplink signal for determining a spatial transmission filter parameter according to the new reference signal, or an uplink channel or uplink signal for determining a spatial transmission filter parameter according to a channel or signal including beam failure request information.

From a seventh moment, the quasi co-location reference signal of the predetermined downlink channel and/or downlink signal is updated according to the new reference signal. The predetermined downlink channel includes one or more of a third-type CORESET and a PDSCU scheduled by the third-type CORESET. Before the seventh moment, the third-type CORESET and a reference signal in the beam failure detection reference signal set are caused to satisfy a quasi co-location relationship; alternatively, a beam failure detection reference signal is acquired according to a quasi co-location reference signal of a CORESET.

One or more of the first moment, the second moment, the third moment, the fourth moment, the fifth moment, the sixth moment, or the seventh moment include one of the following moments: a predetermined moment after the beam failure request information of the first frequency domain bandwidth is transmitted, a predetermined moment after the response information of the beam failure request information of the first frequency domain bandwidth is received, or a moment determined according to a manner of transmitting the beam failure request information.

A CORESET group satisfies at least one of the features below.

The CORESET group includes a CORESET in one or more frequency domain bandwidths. CORESETs in the CORESET group are associated with the same identifier number.

A time domain parameter of a search space includes at least one of the following: the period of the search space, monitoring occasions of the search space in one slot, monitoring occasions of the search space in one period, or the number of slots for which one monitoring occasion of the search space lasts.

A beam failure recovery parameter includes at least one of the following: a beam failure detection reference signal set, a candidate reference signal set, a new reference signal, a downlink channel and/or downlink signal whose quasi co-location reference signal is acquired according to the new reference signal, an uplink channel and/or uplink signal whose spatial transmission filter parameter is acquired according to the new reference signal, an uplink channel or uplink signal whose spatial transmission filter information is acquired according to a spatial transmission filter of a channel or signal including beam failure request information, a beam failure detection counter, a beam failure request information transmission counter, a beam failure detection timer, a beam failure recovery timer, a monitoring timer, the channel or signal including the beam failure request information, a beam failure recovery control channel resource including monitoring beam failure response information, a CORESET satisfying a quasi co-location relationship with a beam failure detection reference signal, a beam failure recovery parameter of one frequency domain bandwidth, a priority corresponding to SR information of a resource request including the beam failure request information, or a parameter configured or determined for a beam failure recovery process.

An uplink channel includes a PUCCH. The PUCCH satisfies at least one of the features below.

The PUCCH belongs to one PUCCH group. The PUCCH is associated with a predetermined CORESET group. The PUCCH includes PUCCHs belonging to different PUCCH groups.

A CORESET set satisfies at least one of the features below.

CORESETs in the same CORESET set satisfy a quasi co-location relationship with respect to the predetermined quasi co-location parameter. CORESETs in the same CORESET set have the same quasi co-location reference signal associated with the predetermined quasi co-location parameter. CORESETs in different CORESET sets do not satisfy a quasi co-location relationship with respect to the predetermined quasi co-location parameter. CORESETs in different CORESET sets have different quasi co-location reference signals associated with the predetermined quasi co-location parameter.

The information determination module is configured to perform the processes below.

The number of sets of quasi co-location parameters of the downlink channel or downlink signal is determined according to signaling information. The signaling information includes the scheme information of a PDSCH. The interval between the downlink channel or signal and a PDCCH scheduling the downlink channel or downlink signal is smaller than a predetermined value. In the case where the number of sets of quasi co-location parameters is greater than 1, different sets of quasi co-location parameters include the same-type quasi co-location parameter.

Moreover/alternatively, a receivable scheme range of the PDSCH is determined according to the capacity information reported by a communication node. The capacity information includes the number of sets of spatial Rx parameters associated with channels or signals received at the same moment. The communication node includes a communication node receiving the PDSCH.

The information determination module is configured to perform one of the processes below.

The priority of a channel or signal where the beam failure request information is located is determined according to a predetermined rule; here the priority corresponding to the beam failure request information is a predetermined priority. The priority of the channel or signal where the beam failure request information is located is determined according to signaling information.

At least one of the features below is included.

The beam failure request information includes at least one of the following: new reference information or a beam failure event occurring on at least one frequency domain bandwidth; the channel where the beam failure request information is located includes a PUCCH; the channel where the beam failure request information is located includes an SR-PUCCH; the priority of the channel where the beam failure request information is located is a first priority, where two priorities exist; or the priority of the channel where the beam failure request information is located is a second priority, where three priorities exist.

Figure 5:
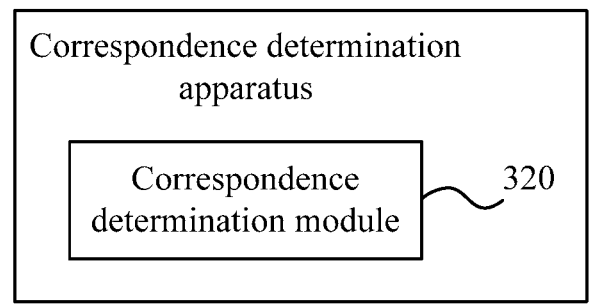
FIG. 5 is a diagram illustrating the structure of a corresponding relationship determination apparatus according to the present application.

This embodiment further provides a corresponding relationship determination apparatus. FIG. 5 is a diagram illustrating the structure of a corresponding relationship determination apparatus according to the present application. As shown in FIG. 5, the corresponding relationship determination apparatus provided in embodiments of the present application can be integrated on a UE. The apparatus includes a corresponding relationship determination module 420.

The corresponding relationship determination module 420 is configured to determine a first corresponding relationship according to signaling information and/or a predetermined rule. The first corresponding relationship includes at least one of the following: a corresponding relationship between N pieces of third information and M sets of beam failure recovery parameters or a corresponding relationship between a first-type frequency domain bandwidth group and a second-type frequency domain bandwidth group. N and M are each a positive integer greater than or equal to 1. A piece of third information includes at least one of the following: a CORESET group or a frequency domain bandwidth group.

The corresponding relationship between the N pieces of third information and the M sets of beam failure recovery parameters includes at least one of the following: N third information values correspond to N sets of beam failure recovery parameters, or each third information value among the N third information values corresponds to one set of beam failure recovery parameters.

The corresponding relationship between the N pieces of third information and the M sets of beam failure recovery parameters includes at least one of the following: N third information values correspond to one beam failure detection reference signal; each third information value among the N third information values corresponds to one candidate reference signal set; or each third information value among the N third information values corresponds to one new reference signal.

In the case where each third information value among the N third information values corresponds to one new reference signal, a new reference signal corresponding to a third information value is from a candidate reference signal set corresponding to the third information value.

The corresponding relationship between the first-type frequency domain bandwidth group and the second-type frequency domain bandwidth group includes at least one of the features below.

The first-type frequency domain bandwidth group and the second-type frequency domain bandwidth group share a division signaling of a frequency domain bandwidth group. The first-type frequency domain bandwidth group and the second-type frequency domain bandwidth group each correspond to a division signaling of a frequency domain bandwidth group. The second-type frequency domain bandwidth group is determined according to a frequency domain bandwidth of a CORESET including a predetermined CORESET index and in the first-type frequency domain bandwidth group.

The first-type frequency domain bandwidth group and the second-type frequency domain bandwidth group satisfy one of the features below.

The first-type frequency domain bandwidth group shares a high-layer signaling for activating or updating a TCI state ID of a PDSCH, and CORESETs with the same CORESET index and in the first-type frequency domain bandwidth group share a high-layer signaling for activating or updating a TCI state ID of a PDSCH. CORESETs with a first CORESET index and in the first-type frequency domain bandwidth group share a high-layer signaling for activating or updating a TCI state ID of a PDSCH, and CORESETs with a second CORESET index and in the second-type frequency domain bandwidth group share a high-layer signaling for activating or updating a TCI state ID of a PDSCH. PUCCH resources with a first PUCCH resource group index and in the first-type frequency domain bandwidth group share a high-layer signaling for activating or updating the spatial relationship information of a PUCCH, and PUCCH resources with a second PUCCH resource group index and in the second-type frequency domain bandwidth group share a high-layer signaling for activating or updating the spatial relationship information of a PUCCH.

A beam failure recovery parameter includes at least one of the following parameters: a beam failure detection reference signal set, a candidate reference signal set, a new reference signal, a downlink channel and/or downlink signal whose quasi co-location reference signal is acquired according to the new reference signal, an uplink channel and/or uplink signal whose spatial transmission filter parameter is acquired according to the new reference signal, an uplink channel or uplink signal whose spatial transmission filter information is acquired according to a spatial transmission filter of a channel or signal including beam failure request information, a beam failure detection counter, a beam failure request information transmission counter, a beam failure detection timer, a beam failure recovery timer, a monitoring timer, the channel or signal including the beam failure request information, a beam failure recovery control channel resource including monitoring beam failure response information, a CORESET satisfying a quasi co-location relationship with a beam failure detection reference signal, a beam failure recovery parameter of one frequency domain bandwidth, a priority corresponding to SR information of a resource request including the beam failure request information, or a parameter configured or determined for a beam failure recovery process.

Figure 6:
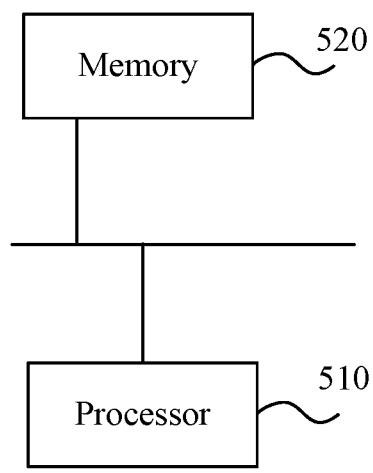
FIG. 6 is a diagram illustrating the structure of a communication device according to the present application.

Embodiments of the present application further provide a communication device. FIG. 6 is a diagram illustrating the structure of a communication device according to the present application. As shown in FIG. 6, the communication device provided in the present application includes one or more processors 510 and a memory 520. One or more processors 510 may be provided in the communication device. In FIG. 6, one processor 510 is taken as an example. The memory 520 is configured to store one or more programs. When executed by the one or more processors 510, the one or more programs cause the one or more processors 510 to perform the method for determining the information described in embodiments of the present application.

The processor 510 and the memory 520 in the communication device may be connected by a bus or in other manners. The connection through a bus is taken as an example in FIG. 6.

As a computer-readable storage medium, the memory 520 may be configured to store software programs, computer-executable programs and modules, such as program instructions/modules (for example, the information determination module 320 in the information determination apparatus) corresponding to the method for determining the information according to embodiments of the present application. The memory 520 may include a program storage region and a data storage region, where the program storage region may store an operating system and an application program required by at least one function while the data storage region may store data created depending on use of a device. Additionally, the memory 520 may include a high-speed random-access memory and may further include a non-volatile memory, for example, at least one magnetic disk memory and flash memory or other non-volatile solid-state memories. In some examples, the memory 520 may include memories which are remotely disposed with respect to the processor 510 and these remote memories may be connected to a first node via a network. Examples of the preceding network include, but are not limited to, the Internet, an intranet, a local area network, a mobile communication network and a combination thereof.

Figure 7:
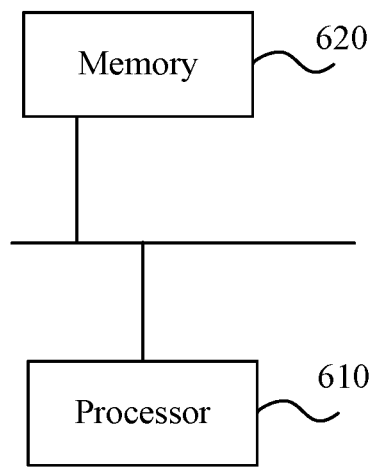
FIG. 7 is a diagram illustrating the structure of a communication device according to the present application.

Embodiments of the present application further provide a communication device. FIG. 7 is a diagram illustrating the structure of a communication device according to the present application. As shown in FIG. 7, the communication device provided in the present application includes one or more processors 610 and a memory 620. One or more processors 610 may be provided in the communication device. In FIG. 7, one processor 610 is taken as an example. The memory 620 is configured to store one or more programs. When executed by the one or more processors 610, the one or more programs cause the one or more processors 610 to perform the method for determining the corresponding relationship described in embodiments of the present application.

The processor 610 and the memory 520 in the communication device may be connected by a bus or in other manners. The connection through a bus is taken as an example in FIG. 7.

As a computer-readable storage medium, the memory 620 may be configured to store software programs, computer-executable programs and modules, such as program instructions/modules (for example, the corresponding relationship determination module 420 in the apparatus for determining the corresponding relationship) corresponding to the method for determining the corresponding relationship according to embodiments of the present application. The memory 620 may include a program storage region and a data storage region, where the program storage region may store an operating system and an application program required by at least one function while the data storage region may store data created depending on use of a device. Additionally, the memory 620 may include a high-speed random-access memory and may further include a non-volatile memory, for example, at least one magnetic disk memory and flash memory or other non-volatile solid-state memories. In some examples, the memory 620 may include memories which are remotely disposed with respect to the processor 610 and these remote memories may be connected to a first node via a network. Examples of the preceding network include, but are not limited to, the Internet, an intranet, a local area network, a mobile communication network and a combination thereof.

Embodiments of the present application further provide a storage medium. The storage medium is configured to store a computer program. When the computer program is executed by a processor, the method for determining the information according to any embodiment of the present application is performed.

The method for determining the information includes determining second information according to first information.

The preceding technical solutions are provided for the case of a large number of CORESETs or frequency domain bandwidths so as to solve the problem of how to reduce the complexity of terminal detection, to perform beam failure recovery rapidly, and to improve the robustness of a link.

The first information includes at least one of the following: a time domain parameter of a search space, a CORESET group, a CORESET set, the number of CORESETs, the number of frequency domain bandwidths, a frequency domain bandwidth group, a PUCCH resource group, a first-type beam failure recovery parameter, signaling information, or a predetermined rule. The second information includes at least one of the following: a second-type beam failure recovery parameter, a radio link reference signal, a frequency domain bandwidth corresponding to a MAC-CE signaling, a PUCCH resource corresponding to the MAC-CE signaling, or a quasi co-location parameter of a downlink channel or downlink signal.

The method for determining the corresponding relationship includes determining a first corresponding relationship according to signaling information and/or a predetermined rule. The first corresponding relationship includes at least one of the following: a corresponding relationship between N pieces of third information and M sets of beam failure recovery parameters or a corresponding relationship between a first-type frequency domain bandwidth group and a second-type frequency domain bandwidth group. N and M are each a positive integer greater than or equal to 1. A piece of third information includes at least one of the following: a CORESET group or a frequency domain bandwidth group.

The term user terminal encompasses any appropriate type of wireless user equipment, such as a mobile phone, a portable data processing apparatus, a portable web browser, or a vehicle-mounted mobile station.

In general, multiple embodiments of the present application may be implemented in hardware or dedicated circuits, software, logics, or any combination thereof. For example, some aspects may be implemented in hardware while other aspects may be implemented in firmware or software that may be executed by a controller, a microprocessor or another computing apparatus, though the present application is not limited thereto.

Embodiments of the present application may be implemented by computer program instructions executed by a data processor of an entity apparatus, for example, implemented in a processor entity, by hardware or by a combination of software and hardware. The computer program instructions may be assembly instructions, instruction set architecture (ISA) instructions, machine instructions, machine-related instructions, microcodes, firmware instructions, status setting data, or source or object codes written in any combination of one or more programming languages.

A block diagram of any logic flow among the drawings of the present application may represent program processes, may represent interconnected logic circuits, modules and functions, or may represent a combination of program processes with logic circuits, modules, and functions. Computer programs may be stored in the memory. The memory may be of any type suitable for the local technical environment and may be implemented using any suitable data storage technology, such as, but not limited to, a read-only memory (ROM), a random-access memory (RAM) and an optical memory device and system (a digital video disc (DVD), or a compact disc (CD)). The computer-readable medium may include a non-transitory storage medium. The data processor may be of any type suitable for the local technical environment such as, but not limited to, a general-purpose computer, a special-purpose computer, a microprocessor, a digital signal processor (DSP), an application-specific integrated circuit (ASIC), a field-programmable gate array (FPGA) and a processor based on a multi-core processor architecture.

To sum up, the present application includes at least the following items:

1. A method for determining the information, including:
    determining second information according to first information, where
    the first information includes at least one of the following: a time domain parameter of a search space, a CORESET group, a CORESET set, a number of CORESETs, a number of frequency domain bandwidths, a frequency domain bandwidth group, a PUCCH resource group, a first-type beam failure recovery parameter, signaling information, or a predetermined rule; and
    the second information includes at least one of the following: a second-type beam failure recovery parameter, a radio link reference signal, a frequency domain bandwidth corresponding to a MAC-CE signaling, a PUCCH resource corresponding to the MAC-CE signaling, or a quasi co-location parameter of a downlink channel or downlink signal.

2. The method according to item 1, where determining the second information according to the first information includes:
    determining a first-type CORESET according to the first information; and
    determining the second information according to the first-type CORESET,
    where the first-type CORESET includes at most A CORESETs, or the first-type CORESET includes at most A CORESET sets, where A is a positive integer greater than or equal to 1.

3. The method according to item 2, where determining the first-type CORESET according to the first information includes one of the following:
    determining the first-type CORESET according to a CORESET in a target CORESET group;
    constituting the first-type CORESET by one CORESET selected from each CORESET group;
    determining the first-type CORESET according to a sequence of first keeping a priority of each CORESET in the each CORESET group unchanged and each CORESET group index in an ascending order and then keeping the priority of the each CORESET in the each CORESET group in a descending order;

determining the first-type CORESET according to a sequence of keeping the each CORESET group index unchanged and the priority of the each CORESET in the each CORESET group in a descending order and then keeping the each CORESET group index in an ascending order.

determining the first-type CORESET according to a time domain parameter of a search space associated with a CORESET;

determining the first-type CORESET according to a CORESET in one frequency domain bandwidth in one frequency domain bandwidth group;

determining the first-type CORESET according to a CORESET in one frequency domain bandwidth in one frequency domain bandwidth group and with a frequency domain bandwidth index satisfying a predetermined feature;

determining the first-type CORESET according to a CORESET in a frequency domain bandwidth with a frequency domain bandwidth index satisfying a predetermined feature;

determining the first-type CORESET according to a beam failure detection reference signal;

acquiring the first-type CORESET according to a CORESET corresponding to a new reference signal, where a corresponding relationship between the new reference signal and the CORESET is acquired through signaling information; or determining the first-type CORESET according to whether a frequency domain bandwidth is a primary frequency domain bandwidth.

4. The method according to item 3, in a case of determining the first-type CORESET according to the CORESET in the target CORESET group, the target CORESET group satisfies at least one of the following features:

the target CORESET group has a highest priority among CORESET groups;

a CORESET group index of the target CORESET group satisfies a predetermined feature;

the target CORESET group includes a CORESET associated with a search space whose time domain parameter satisfies a predetermined feature;

the target CORESET group is acquired according to the received signaling information;

among the CORESET groups, the target CORESET group includes a greatest number of CORESETs;

among the CORESET groups, the target CORESET group includes a greatest number of CORESET sets;

the target CORESET group includes a CORESET with a CORESET index satisfying a predetermined feature;

among the CORESET groups, the target CORESET group includes a greatest number of CORESETs associated with search spaces whose time domain parameters satisfy a predetermined feature;

among the CORESET groups, the target CORESET group includes a greatest number of CORESET sets associated with search spaces whose time domain parameters satisfy a predetermined feature; or one CORESET group is included in the target CORESET group.

5. The method according to item 3, in a case of determining the first-type CORESET according to the CORESET in the target CORESET group, the target CORESET group is determined according to at least one of the following:

a CORESET group index;

a time domain parameter of a search space associated with a CORESET included in a CORESET group;

a number of CORESETs included in a CORESET group;

a number of CORESET sets included in a CORESET group; or an index of a CORESET included in a CORESET group.

6. The method according to item 1, where the second information includes a reference signal set, where the reference signal set includes at least one of the following reference signal sets:

a beam failure detection reference signal set;

a radio link detection reference signal set; or a new reference signal set, where the reference signal set includes at most A reference signals, where A is a positive integer greater than or equal to 1.

7. The method according to item 2 or 6, A is associated with at least one of the following:

a number of CORESET groups;

the number of CORESETs;

reported capacity information;

a number of frequency domain bandwidth groups; or a maximum number of SSBs.

8. The method according to item 2, where determining the first-type CORESET according to the first information includes:

determining the first-type CORESET in a second-type CORESET, where the second-type CORESET is constituted by one CORESET selected from each CORESET set or by a CORESET in one frequency domain bandwidth.

9. The method according to item 8, where determining the first-type CORESET in the second-type CORESET includes at least one of the following:

determining the first-type CORESET in the second-type CORESET according to the first information;

in a case where a number of CORESETs in the second-type CORESET is greater than A, determining the first-type CORESET according to the first information; or in a case where the number of CORESETs in the second-type CORESET is less than or equal to A, including the second-type CORESET in the first-type CORESET.

10. The method according to item 2, where determining the first-type CORESET according to the first information includes:

determining the first-type CORESET in a CORESET included in one frequency domain bandwidth according to a time domain parameter of a search space associated with the CORESET, or determining the first-type CORESET in a CORESET included in one CORESET group, where the time domain parameter of the search space includes at least one of the following:

a period of the search space;

monitoring occasions of the search space in one slot;

monitoring occasions of the search space in one period; or a number of slots for which one monitoring occasion of the search space lasts.

11. The method according to item 10, where the first-type CORESET includes A CORESETs, where A search spaces corresponding to the A CORESETs satisfy one of the following features:

the A search spaces have shortest periods;

the A search spaces have largest numbers of monitoring occasions in one slot;

the A search spaces have largest numbers of slots for which one monitoring occasion lasts; or the A search spaces have highest time domain density, where the time domain density is determined according to time domain parameters.

12. The method according to item 11, where the time domain density is determined according to one of the following:

a first quotient, where the first quotient is equal to a quotient of a first product and a period of a search space, and the first product is equal to a product of a number of monitoring occasions of the search space in one slot and a number of slots for which one monitoring occasion of the search space lasts; or a second quotient, where the second quotient is equal to a quotient of a number of monitoring occasions of a search space in one slot and the period of the search space.

13. The method according to any one of items 2 to 12, where determining the second information according to the first-type CORESET includes at least one of the following:

determining a beam failure detection reference signal according to the first-type CORESET;

determining a radio link detection reference signal according to the first-type CORESET;

determining, according to the first-type CORESET, a downlink channel or downlink signal whose quasi co-location reference signal is determined according to a new reference signal;

determining an uplink channel or uplink signal according to the first-type CORESET, where a spatial transmission filter of the uplink channel or uplink signal is determined according to a new reference signal;

determining an uplink channel or uplink signal according to the first-type CORESET, where a spatial transmission filter of the uplink channel or uplink signal is determined according to a channel and/or signal including beam failure request information;

determining, according to the first-type CORESET, a CORESET satisfying a quasi co-location relationship with a beam failure detection reference signal; or determining, according to the first-type CORESET, a CORESET satisfying a quasi co-location relationship with a radio link detection reference signal.

14. The method according to item 1, further including at least one of the following:

acquiring n reference signals according to n quasi co-location reference signals in m quasi co-location reference signals of one CORESET, where the m quasi co-location reference signals are each associated with a spatial Rx parameter, where m and n are each a positive integer greater than or equal to 1;

acquiring, according to p new reference signals, quasi co-location reference signals corresponding to q resource groups in m resource groups of one CORESET, where p and q are each a positive integer greater than or equal to 1; or causing reference signals and z resource groups in m resource groups of one CORESET to satisfy a quasi co-location relationship, where z is a positive integer less than or equal to m, where a reference signal includes at least one of the following: a beam failure detection reference signal, a new reference signal, or a radio link detection reference signal, where one CORESET is associated with m resource groups, and each resource group among the m resource groups corresponds to one quasi co-location reference signal set.

15. The method according to item 13, in a case where the downlink channel or downlink signal whose quasi co-location reference signal is determined according to the new reference signal is determined according to the first-type CORESET, including:

not updating, according to the new reference signal, a quasi co-location reference signal of a CORESET not belonging to the first-type CORESET and in one frequency domain bandwidth; and/or updating, according to the new reference signal, a quasi co-location reference signal of a CORESET belonging to the first-type CORESET and in one frequency domain bandwidth.

16. The method according to item 1, where determining the second information according to the first information includes one of the following:

in a case where the number of frequency domain bandwidths is greater than a first predetermined value, determining the second information according to the first information;

in a case where a number of frequency domain bandwidths configured with the second information is greater than a second predetermined value, determining the second information according to the first information;

in a case where a total number of first-type reference signals in the frequency domain bandwidth group is greater than a third predetermined value, determining the second information according to the first information; or in a case where the total number of first-type reference signals in the frequency domain bandwidth group is greater than a fourth predetermined value in a predetermined time segment, determining the second information according to the first information, where one of the first-type reference signals includes at least one of the following: a beam failure detection reference signal, a radio link detection reference signal, or a new reference signal.

17. The method according to item 1, in a case where the first information includes signaling information and/or a frequency domain bandwidth group and the second information includes a beam failure recovery parameter, determining the second information according to the first information includes at least one of the following:

from a first moment, a quasi co-location reference signal of a predetermined downlink channel and/or downlink signal in a second frequency domain bandwidth is acquired according to a second reference signal, where the second reference signal corresponds to a new reference signal of a first frequency domain bandwidth, where the first frequency domain bandwidth and the second frequency domain bandwidth belong to a same frequency domain bandwidth group;

from a second moment, a spatial transmission filter of a predetermined uplink channel and/or uplink signal in the second frequency domain is acquired according to the new reference signal of the first frequency domain bandwidth, where the first frequency domain bandwidth and the second frequency domain bandwidth belong to the same frequency domain bandwidth group;

from a third moment, a quasi co-location reference signal of a predetermined downlink channel and/or downlink signal in each frequency domain bandwidth in the frequency domain bandwidth group is acquired according to the second reference signal, where the second reference signal corresponds to the new reference signal of the first frequency domain bandwidth, and the frequency domain bandwidth group includes the first frequency domain bandwidth;

from a fourth moment, a spatial transmission filter of a predetermined uplink channel and/or uplink signal in the each frequency domain bandwidth in the frequency domain bandwidth group is acquired according to the new reference signal of the first frequency domain bandwidth, where the frequency domain bandwidth group includes the first frequency domain bandwidth;

from a fifth moment, in a case where a quasi co-location reference signal of a CORESET in the first frequency domain bandwidth is acquired according to the new reference signal of the first frequency domain bandwidth, a quasi co-location reference signal of a CORESET in the second frequency domain bandwidth is acquired according to the second reference signal, where the second reference signal corresponds to the new reference signal of the first frequency domain bandwidth, the first frequency domain bandwidth and the second frequency domain bandwidth belong to the same frequency domain bandwidth group, and a CORESET index of the CORESET in the first frequency domain bandwidth is same as a CORESET index of the CORESET in the second frequency domain bandwidth; or it is determined according to the signaling information whether, from the first moment, only the quasi co-location reference signal of the CORESET in the first frequency domain bandwidth is acquired according to the new reference signal or a quasi co-location reference signal of a CORESET in each frequency domain bandwidth in a frequency domain bandwidth group where the first frequency domain bandwidth is located is acquired according to the second reference signal.

18. The method according to item 17, where a predetermined downlink channel includes at least one of the following channels:

a first-type CORESET; or a downlink channel scheduled by a PDCCH in the first-type CORESET, where the first-type CORESET is determined according to the first information.

19. The method according to item 17, including at least one of the following:

the new reference signal is in the first frequency domain bandwidth;

the second reference signal is in the second frequency domain bandwidth;

the second reference signal is associated with a quasi co-location reference signal of a predetermined type;

the second reference signal and a predetermined downlink channel and/or downlink signal are in a same frequency domain bandwidth;

a difference between an index of a transmission configuration indication (TCI) state where the second reference signal is located and an index of a TCI state where the new reference signal is located is fixed;

a difference between an index of a resource where the second reference signal is located and an index of a resource where the new reference signal is located is fixed;

the second reference signal is the new reference signal in the first frequency domain bandwidth; or in a case where the first frequency domain bandwidth and a predetermined downlink channel and/or downlink signal are in a same serving cell, the second reference signal is the new reference signal in the first frequency domain bandwidth.

20. The method according to item 1, where determining the second information according to the first information includes at least one of the following:

determining, according to a predetermined rule, a frequency domain bandwidth corresponding to a first-type MAC-CE signaling, where the predetermined rule includes that in a case where an RRC signaling is configured with a frequency domain bandwidth group, the frequency domain bandwidth corresponding to the MAC-CE signaling includes the frequency domain bandwidth group or a frequency domain bandwidth group where a frequency domain bandwidth corresponding to a frequency domain bandwidth index carried in the MAC-CE signaling is located;

determining, according to a predetermined rule, a frequency domain bandwidth corresponding to a first-type MAC-CE signaling, where the predetermined rule includes that in a case where an RRC signaling is configured with no frequency domain bandwidth group, the frequency domain bandwidth corresponding to the MAC-CE signaling includes a frequency domain bandwidth corresponding to a frequency domain bandwidth index carried in the MAC-CE signaling;

determining, according to a predetermined rule, a PUCCH corresponding to a MAC-CE signaling for activating or updating PUCCH spatial relationship information, where the predetermined rule includes that in a case where an RRC signaling is configured with a PUCCH group, a PUCCH corresponding to the MAC-CE signaling includes the PUCCH group or a PUCCH group where a PUCCH resource corresponding to a PUCCH resource index carried in the MAC-CE signaling is located;

determining, according to a predetermined rule, a PUCCH corresponding to a MAC-CE signaling for activating or updating PUCCH spatial relationship information, where the predetermined rule includes that in a case where no PUCCH group is configured, the PUCCH corresponding to the MAC-CE signaling includes a PUCCH resource corresponding to a PUCCH resource index carried in the MAC-CE signaling;

determining, according to signaling information, whether a first-type MAC-CE signaling corresponds to a frequency domain bandwidth or a frequency domain bandwidth group;

determining, according to signaling information, whether a first-type MAC-CE signaling corresponds to a PUCCH resource or a PUCCH resource group; or activating or updating, according to a MAC-CE signaling, spatial relationship information of a PUCCH resource, with a predetermined PUCCH resource group index, in each frequency domain bandwidth in a frequency domain bandwidth group, where a first-type MAC-CE includes one of the following: a MAC-CE for activating or updating a TCI state ID of a PDSCH, a MAC-CE for activating or updating a TCI state ID of a CORESET, a PUCCH with a PUCCH spatial relationship activated or updated, or a PUCCH with a spatial relationship of a PUCCH resource group activated or updated.

21. The method according to any one of items 1 to 20, where a frequency domain bandwidth group satisfies at least one of the following features:
- division of the frequency domain bandwidth group is determined according to signaling information;
- one master cell group (MCG) includes one or more frequency domain bandwidth groups;
- one secondary cell group (SCG) includes one or more frequency domain bandwidth groups;
- the frequency domain bandwidth group shares a high-layer signaling for activating or updating a TCI state ID of a PDSCH;
- CORESETs with a same CORESET index and in the frequency domain bandwidth group share a high-layer signaling for activating or updating a TCI state ID of a PDSCH;
- the frequency domain bandwidth group shares a high-layer signaling for activating or updating spatial relationship information of a PUCCH;
- the frequency domain bandwidth group shares a high-layer signaling for activating or updating spatial relationship information of a PUCCH resource group;
- the frequency domain bandwidth group includes a BWP in one serving cell.

22. The method according to item 1, where determining the second information according to the first information includes:
- from a sixth moment, a quasi co-location reference signal of a CORESET in the CORESET group is acquired according to a new reference signal corresponding to the CORESET group, where each new reference signal corresponds to one CORESET group, new reference signal reporting information of one frequency domain bandwidth includes indication information of more than one new reference signal, and each of the more than one new reference signal corresponds to one CORESET group.

23. The method according to item 1, where determining the second information according to the first information includes:
- acquiring, according to a beam failure detection reference signal set, at least one of the following:
- a predetermined downlink channel and/or downlink signal whose quasi co-location reference signal is determined according to a new reference signal;
- an uplink channel or uplink signal whose spatial transmission filter parameter is determined according to the new reference signal; or
- an uplink channel or uplink signal whose spatial transmission filter parameter is determined according to a channel or signal including beam failure request information.

24. The method according to item 23, including:
- from a seventh moment, updating the quasi co-location reference signal of the predetermined downlink channel and/or downlink signal according to the new reference signal, where the predetermined downlink channel includes one or more of a third-type CORESET and a PDSCU scheduled by the third-type CORESET; and
- before the seventh moment, causing the third-type CORESET and a reference signal in the beam failure detection reference signal set to satisfy a quasi co-location relationship or acquiring a beam failure detection reference signal according to a quasi co-location reference signal of a CORESET.

25. The method according to item 17, 22, or 24, where one or more of a first moment, a second moment, a third moment, a fourth moment, a fifth moment, a sixth moment, or the seventh moment include one of the following moments:
- a predetermined moment after beam failure request information of a first frequency domain bandwidth is transmitted;
- a predetermined moment after response information of the beam failure request information of the first frequency domain bandwidth is received; or
- a moment determined according to a manner of transmitting the beam failure request information.

26. The method according to any one of items 1 to 25, where the CORESET group satisfies at least one of the following features:
- the CORESET group includes a CORESET in one or more frequency domain bandwidths; or
- CORESETs in the CORESET group are associated with a same identifier number.

27. The method according to any one of items 1 to 25, where the time domain parameter of the search space includes at least one of the following:
- a period of the search space;
- a number of monitoring occasions of the search space in one slot;
- a number of monitoring occasions of the search space in one period; or
- a number of slots for which one monitoring occasion of the search space lasts.

28. The method according to any one of items 1 to 25, where a beam failure recovery parameter includes at least one of the following:
- a beam failure detection reference signal set, a candidate reference signal set, a new reference signal, a downlink channel and/or downlink signal whose quasi co-location reference signal is acquired according to the new reference signal, an uplink channel and/or uplink signal whose spatial transmission filter parameter is acquired according to the new reference signal, an uplink channel or uplink signal whose spatial transmission filter information is acquired according to a spatial transmission filter of a channel or signal including beam failure request information, a beam failure detection counter, a beam failure request information transmission counter, a beam failure detection timer, a beam failure recovery timer, a monitoring timer, the channel or signal including the beam failure request information, a beam failure recovery control channel resource including monitoring beam failure response information, a CORESET satisfying a quasi co-location relationship with a beam failure detection reference signal, a beam failure recovery parameter of one frequency domain bandwidth, a priority corresponding to SR information of a resource request including the beam failure request information, or a parameter configured or determined for a beam failure recovery process.

29. The method according to item 28, where an uplink channel includes a PUCCH, where the PUCCH satisfies at least one of the following features:
- the PUCCH belongs to one PUCCH group;
- the PUCCH is associated with a predetermined CORESET group; or
- the PUCCH includes PUCCHs belonging to different PUCCH groups.

30. The method according to any one of items 1 to 25, where the CORESET set satisfies at least one of the following features:

CORESETs in a same CORESET set satisfy a quasi co-location relationship with respect to a predetermined quasi co-location parameter;

the CORESETs in the same CORESET set have a same quasi co-location reference signal associated with the predetermined quasi co-location parameter;

CORESETs in different CORESET sets do not satisfy a quasi co-location relationship with respect to the predetermined quasi co-location parameter; or the CORESETs in the different CORESET sets have different quasi co-location reference signals associated with the predetermined quasi co-location parameter.

31. The method according to item 1, where determining the second information according to the first information includes:

determining a number of sets of quasi co-location parameters of the downlink channel or downlink signal according to the signaling information, where the signaling information includes scheme information of a PDSCH; and an interval between the downlink channel or downlink signal and a PDCCH scheduling the downlink channel or downlink signal is smaller than a predetermined value; and in a case where the number of sets of quasi co-location parameters is greater than 1, different sets of quasi co-location parameters include a same-type quasi co-location parameter; and/or determining a receivable scheme range of the PDSCH according to capacity information reported by a communication node, where the capacity information includes a number of sets of spatial Rx parameters associated with channels or signals received at a same moment, where the communication node includes a communication node receiving the PDSCH.

32. The method according to item 1, where determining the second information according to the first information includes one of the following:

determining, according to a predetermined rule, a priority of a channel or signal where beam failure request information is located, where the priority corresponding to the beam failure request information is a predetermined priority; or determining, according to signaling information, the priority of the channel or signal where the beam failure request information is located.

33. The method according to item 32, further including at least one of the following:

the beam failure request information includes at least one of the following: new reference information or a beam failure event occurring on at least one frequency domain bandwidth;

the channel where the beam failure request information is located includes a PUCCH;

the channel where the beam failure request information is located includes an SR-PUCCH;

the priority of the channel where the beam failure request information is located is a first priority, where two priorities exist; or the priority of the channel where the beam failure request information is located is a second priority, where three priorities exist.

34. A method for determining a corresponding relationship, including:

determining a first corresponding relationship according to signaling information and/or a predetermined rule, where the first corresponding relationship includes at least one of the following: a corresponding relationship between N pieces of third information and M sets of beam failure recovery parameters or a corresponding relationship between a first-type frequency domain bandwidth group and a second-type frequency domain bandwidth group, where N and M are each a positive integer greater than or equal to 1, and a piece of third information among the N pieces of third information includes at least one of the following: a CORESET group or a frequency domain bandwidth group.

35. The method according to item 34, where the corresponding relationship between the N pieces of third information and the M sets of beam failure recovery parameters includes at least one of the following:

N third information values correspond to N sets of beam failure recovery parameters among the M sets of beam failure recovery parameters; or each third information value among the N third information values corresponds to one set of beam failure recovery parameters among the M sets of beam failure recovery parameters.

36. The method according to item 34, where the corresponding relationship between the N pieces of third information and the M sets of beam failure recovery parameters includes at least one of the following:

N third information values correspond to one beam failure detection reference signal;

each third information value among the N third information values corresponds to one candidate reference signal set; or the each third information value among the N third information values corresponds to one new reference signal.

37. The method according to item 36, where in a case where the each third information value among the N third information values corresponds to the one new reference signal, a new reference signal corresponding to a third information value among the N third information values is from a candidate reference signal set corresponding to the third information value.

38. The method according to item 34, where the corresponding relationship between the first-type frequency domain bandwidth group and the second-type frequency domain bandwidth group includes at least one of the following:

the first-type frequency domain bandwidth group and the second-type frequency domain bandwidth group share a division signaling of a frequency domain bandwidth group;

the first-type frequency domain bandwidth group and the second-type frequency domain bandwidth group each correspond to a division signaling of a frequency domain bandwidth group; or the second-type frequency domain bandwidth group is determined according to a frequency domain bandwidth of a CORESET including a predetermined CORESET index and in the first-type frequency domain bandwidth group.

39. The method according to item 38, where the first-type frequency domain bandwidth group and the second-type frequency domain bandwidth group satisfy at least one of the following features:

the first-type frequency domain bandwidth group shares a high-layer signaling for activating or updating a TCI state ID of a PDSCH, and CORESETs with a same CORESET index and in the second-type frequency domain bandwidth group share a high-layer signaling for activating or updating a TCI state ID of a PDSCH;

CORESETs with a first CORESET index and in the first-type frequency domain bandwidth group share a high-layer signaling for activating or updating a TCI state ID of a PDSCH, and CORESETs with a second CORESET index and in the second-type frequency domain bandwidth group share a high-layer signaling for activating or updating a TCI state ID of a PDSCH; or PUCCH resources with a first PUCCH resource group index and in the first-type frequency domain bandwidth group share a high-layer signaling for activating or updating spatial relationship information of a PUCCH, and PUCCH resources with a second PUCCH resource group index and in the second-type frequency domain bandwidth group share a high-layer signaling for activating or updating spatial relationship information of a PUCCH.

40. The method according to any one of items 34 to 39, where a beam failure recovery parameter includes at least one of the following parameters:

a beam failure detection reference signal set, a candidate reference signal set, a new reference signal, a downlink channel and/or downlink signal whose quasi co-location reference signal is acquired according to the new reference signal, an uplink channel and/or uplink signal whose spatial transmission filter parameter is acquired according to the new reference signal, an uplink channel or uplink signal whose spatial transmission filter information is acquired according to a spatial transmission filter of a channel or signal including beam failure request information, a beam failure detection counter, a beam failure request information transmission counter, a beam failure detection timer, a beam failure recovery timer, a monitoring timer, the channel or signal including the beam failure request information, a beam failure recovery control channel resource including monitoring beam failure response information, a CORESET satisfying a quasi co-location relationship with a beam failure detection reference signal, a beam failure recovery parameter of one frequency domain bandwidth, a priority corresponding to SR information of a resource request including the beam failure request information, or a parameter configured or determined for a beam failure recovery process.

41. An information determination apparatus, including:
an information determination module configured to determine second information according to first information, where the first information includes at least one of the following: a time domain parameter of a search space, a CORESET group, a CORESET set, a number of CORESETs, a number of frequency domain bandwidths, a frequency domain bandwidth group, a PUCCH resource group, a first-type beam failure recovery parameter, signaling information, or a predetermined rule; and the second information includes at least one of the following: a second-type beam failure recovery parameter, a radio link reference signal, a frequency domain bandwidth corresponding to a MAC-CE signaling, a PUCCH resource corresponding to the MAC-CE signaling, or a quasi co-location parameter of a downlink channel or downlink signal.

42. An apparatus for determining a corresponding relationship, including:

a corresponding relationship determination module configured to determine a first corresponding relationship according to signaling information and/or a predetermined rule, where the first corresponding relationship includes at least one of the following: a corresponding relationship between N pieces of third information and M sets of beam failure recovery parameters or a corresponding relationship between a first-type frequency domain bandwidth group and a second-type frequency domain bandwidth group, where N and M are each a positive integer greater than or equal to 1, and a piece of third information among the N pieces of third information includes at least one of the following: a CORESET group or a frequency domain bandwidth group.

43. A communication device including one or more processors and a memory configured to store one or more programs, where when executed by the one or more processors, the one or more programs cause the one or more processors to perform the method according to any one of items 1 to 33 or the method according to any one of items 34 to 40.

44. A computer storage medium storing a computer program, where when the computer program is executed by a processor, the method according to any one of items 1 to 33 or the method according to any one of items 34 to 40 is performed.

The invention claimed is:

1. A method for determining a corresponding relationship, being applied by a wireless radio communication node and comprising:

determining a corresponding relationship between N control resource set (CORESET) groups and N sets of beam failure recovery parameters according to a predetermined rule, wherein N is a positive integer greater than 1;

each of the N CORESET groups comprises CORESETs, which are associated with a same identifier number, in one bandwidth part (BWP);

the corresponding relationship between the N CORESET groups and the N sets of beam failure recovery parameters comprises: the N CORESET groups correspond to the N sets of beam failure recovery parameters; and each of the N CORESET groups corresponds to one of the N sets of beam failure recovery parameters; and each of the N sets of beam failure recovery parameters comprises: a beam failure detection reference signal set and a candidate reference signal set.

2. The method according to claim 1, wherein in a case where each of the N CORESET groups corresponds to a respective new reference signal, the respective new reference signal is from a candidate reference signal set corresponding to the each of the N CORESET groups.

3. The method according to claim 1, wherein
a first-type frequency domain bandwidth group and a second-type frequency domain bandwidth group share a division signaling of a frequency domain bandwidth group; and
the first-type frequency domain bandwidth group and the second-type frequency domain bandwidth group satisfy that first-type frequency domain bandwidths in the first-type frequency domain bandwidth group share a high-layer signaling for activating or updating a transmission configuration indication state identifier (TCI state ID) of a physical downlink shared channel (PDSCH) and second-type frequency domain bandwidths in the second-type frequency domain bandwidth group share a high-layer signaling for activating or updating a TCI state ID of CORESETs with a first CORESET index.

4. The method according to claim 1, wherein the each of the N sets of beam failure recovery parameters further comprises at least one of the following parameters:
a new reference signal,
at least one of a downlink channel or a downlink signal whose quasi co-location reference signal is acquired according to the new reference signal,
a beam failure detection counter,
a beam failure detection timer, or
a channel or signal comprising beam failure request information.

5. The method according to claim 1, further comprising:
from a sixth moment, acquiring a quasi co-location reference signal of a CORESET in one CORESET group of the N CORESET groups according to a new reference signal corresponding to the one CORESET group, wherein new reference signal reporting information of one BWP comprises indication information of more than one new reference signal, and each of the more than one new reference signal corresponds to one CORESET group of the N CORESET groups; wherein, the sixth moment comprises a predetermined moment after response information of beam failure request information of the one BWP is received.

6. The method according to claim 5, further comprising at least one of the following:
determining, according to a predetermined rule, a frequency domain bandwidth corresponding to a first-type medium access control-control element (MAC-CE) signaling, wherein the predetermined rule comprises that in a case where a radio resource control (RRC) signaling configures a frequency domain bandwidth group, the frequency domain bandwidth corresponding to the first-type MAC-CE signaling comprises frequency domain bandwidths in a frequency domain bandwidth group of a frequency domain bandwidth index carried in the first-type MAC-CE signaling, wherein the first-type MAC-CE signaling comprises one of the following: a MAC-CE signaling for activating or updating a TCI state ID of a PDSCH, or a MAC-CE signaling for activating or updating a TCI state ID of a CORESET;
determining, according to a predetermined rule, a frequency domain bandwidth corresponding to a first-type MAC-CE signaling, wherein the predetermined rule comprises that in a case where an RRC signaling configures no frequency domain bandwidth group, the frequency domain bandwidth corresponding to the first-type MAC-CE signaling comprises a frequency domain bandwidth corresponding to a frequency domain bandwidth index carried in the first-type MAC-CE signaling, wherein the first-type MAC-CE signaling comprises one of the following: a MAC-CE signaling for activating or updating a TCI state ID of a PDSCH, or a MAC-CE signaling for activating or updating a TCI state ID of a CORESET;
determining, according to a predetermined rule, a physical uplink control channel (PUCCH) resource corresponding to a first-type MAC-CE signaling for activating or updating PUCCH spatial relationship information, wherein the predetermined rule comprises that in a case where an RRC signaling configures a PUCCH resource group, a PUCCH resource corresponding to the first-type MAC-CE signaling includes a PUCCH resource group where a PUCCH resource corresponding to a PUCCH resource index carried in the first-type MAC-CE signaling is located, wherein the first-type MAC-CE signaling comprises one of the following: a MAC-CE signaling for updating or activating a PUCCH spatial relationship, or a MAC-CE signaling for activating or updating a spatial relationship of a PUCCH resource group; or
determining, according to a predetermined rule, a PUCCH resource corresponding to a first-type MAC-CE signaling for activating or updating PUCCH spatial relationship information, wherein the predetermined rule comprises that in a case where no PUCCH group is configured, the PUCCH resource corresponding to the first-type MAC-CE signaling comprises a PUCCH resource corresponding to a PUCCH resource index carried in the first-type MAC-CE signaling, wherein the first-type MAC-CE signaling comprises one of the following: a MAC-CE signaling for updating or activating a PUCCH spatial relationship, or a MAC-CE signaling for activating or updating a spatial relationship of a PUCCH resource group.

7. The method according to claim 1, further comprising:
determining a first-type CORESET according to a CORESET group index and a time domain parameter of a search space associated with a CORESET comprised in the CORESET group; and
determining the beam failure detection reference signal set according to the first-type CORESET,
wherein the first-type CORESET comprises at most A CORESETs, and the beam failure detection reference signal set comprises at most A reference signals, wherein A is determined by N a number of CORESETs, and reported capacity information.

8. The method according to claim 7, wherein
the first-type CORESET belongs to the CORESET group;
the beam failure detection reference signal set is determined according to a priority of a CORESET, wherein a priority of one CORESET with a search space of shorter period is higher, and the time domain parameter of the search space comprises the period of the search space; and in response to two search spaces corresponding two CORESETs having a same period, a priority of one of the two CORESETs having a higher index is higher; and
the beam failure detection reference signal set is acquired according to a quasi co-location parameter, associated with a spatial Rx parameter, of the first-type CORESET.

9. The method according to claim 1, further comprising:
acquiring m beam failure detection reference signal according to m quasi co-location reference signals of one CORESET, wherein the m quasi co-location reference signals are each associated with a spatial Rx parameter, wherein m is a positive integer greater than 1.

10. The method according to claim 1, further comprising at least one of the following:
from a first moment, acquiring a quasi co-location reference signal of at least one of a predetermined downlink channel or a predetermined downlink signal in a second frequency domain bandwidth according to a second reference signal, wherein the second reference signal corresponds to a new reference signal of a first frequency domain bandwidth, wherein the first frequency domain bandwidth and the second frequency domain bandwidth belong to a same frequency domain bandwidth group;

from a second moment, acquiring a spatial transmission filter of at least one of a predetermined uplink channel or a predetermined uplink signal in the second frequency domain according to the new reference signal of the first frequency domain bandwidth, wherein the first frequency domain bandwidth and the second frequency domain bandwidth belong to the same frequency domain bandwidth group;

from a third moment, acquiring a quasi co-location reference signal of at least one of a predetermined downlink channel or a predetermined downlink signal in each frequency domain bandwidth in the frequency domain bandwidth group according to a respective second reference signal of the each frequency domain bandwidth, wherein the respective second reference signal and the new reference signal of the first frequency domain bandwidth has a corresponding relationship, and the frequency domain bandwidth group comprises the first frequency domain bandwidth;

from a fourth moment, acquiring a spatial transmission filter of at least one of a predetermined uplink channel or a predetermined uplink signal in the each frequency domain bandwidth in the frequency domain bandwidth group according to the new reference signal of the first frequency domain bandwidth, wherein the frequency domain bandwidth group comprises the first frequency domain bandwidth;

from a fifth moment, in a case where a quasi co-location reference signal of a CORESET in the first frequency domain bandwidth is acquired according to the new reference signal of the first frequency domain bandwidth, acquiring a quasi co-location reference signal of a CORESET in the second frequency domain bandwidth according to the second reference signal, wherein the second reference signal and the new reference signal of the first frequency domain bandwidth has a corresponding relationship, the first frequency domain bandwidth and the second frequency domain bandwidth belong to the same frequency domain bandwidth group, and a CORESET index of the CORESET in the first frequency domain bandwidth is same as a CORESET index of the CORESET in the second frequency domain bandwidth; or determining according to the signaling information whether a first operation or a second operation is performed, wherein the first operation is that from the first moment, only the quasi co-location reference signal of a CORESET in the first frequency domain bandwidth is acquired according to the new reference signal; and the second operation is that from the first moment, a quasi co-location reference signal of a CORESET in each frequency domain bandwidth in a frequency domain bandwidth group where the first frequency domain bandwidth is located is acquired according to the second reference signal;

wherein the predetermined downlink channel comprises at least one of the following channels: a first-type CORESET; or a downlink channel scheduled by a physical downlink control channel (PDCCH) in the first-type CORESET, wherein the first-type CORESET is determined according to one of the N CORESET groups;

wherein at least one of the following is satisfied: the new reference signal is in the first frequency domain bandwidth; the second reference signal is in the second frequency domain bandwidth; the second reference signal is associated with a quasi co-location reference signal of a predetermined type; the second reference signal and at least one of the predetermined downlink channel or downlink signal are in a same frequency domain bandwidth; a difference between an index of a transmission configuration indication (TCI) state where the second reference signal is located and an index of a TCI state where the new reference signal is located is fixed; and a difference between an index of a resource where the second reference signal is located and an index of a resource where the new reference signal is located is fixed; wherein the first moment, the second moment, the third moment, and the fourth moment each comprise a predetermined moment after response information of beam failure request information of the first frequency domain bandwidth is received.

11. The method according to claim 1, further comprising at least one of:

respectively performing the following operations according to each of the N sets of beam failure recovery parameters: beam failure detection, beam failure request, and new reference signal indication reporting;

in response to beam failure requests of the N CORESET groups being reported simultaneously, the beam failure requests of the N CORESET groups are reported after combination; or in response to new reference signal indication reporting of the N CORESET groups being reported simultaneously, the new reference signal indication reporting of the N CORESET groups is reported after combination.

12. An apparatus for determining a corresponding relationship, comprising:

at least one processor; and a memory configured to store at least one program, wherein when executed by the at least one processor, the at least one program causes the at least one processor to perform the following:

determining a corresponding relationship between N control resource set (CORESET) groups and N sets of beam failure recovery parameters according to a predetermined rule, wherein N is a positive integer greater than 1;

each of the N CORESET groups comprises CORESETs, which are associated with a same identifier number, in one bandwidth part (BWP);

the corresponding relationship between the N CORESET groups and the N sets of beam failure recovery parameters comprises: the N CORESET groups correspond to the N sets of beam failure recovery parameters; and each of the N CORESET groups corresponds to one of the N sets of beam failure recovery parameters; and each of the N sets of beam failure recovery parameters comprises: a beam failure detection reference signal set and a candidate reference signal set.

13. The apparatus according to claim 12, wherein the at least one processor is caused to further perform the following:

from a sixth moment, acquiring a quasi co-location reference signal of a CORESET in one CORESET group of the N CORESET groups according to a new reference signal corresponding to the one CORESET group, wherein new reference signal reporting information of one BWP comprises indication information of more than one new reference signal, and each of the more than one new reference signal corresponds to one CORESET group of the N CORESET groups; wherein the sixth moment comprises a predetermined moment after response information of beam failure request information of the one BWP is received.

14. The apparatus according to claim 13, wherein the at least one processor is caused to further perform at least one of the following:
determining, according to a predetermined rule, a frequency domain bandwidth corresponding to a first-type medium access control-control element (MAC-CE) signaling, wherein the predetermined rule comprises that in a case where a radio resource control (RRC) signaling configures a frequency domain bandwidth group, the frequency domain bandwidth corresponding to the first-type MAC-CE signaling comprises frequency domain bandwidths in a frequency domain bandwidth group of a frequency domain bandwidth index carried in the first-type MAC-CE signaling, wherein the first-type MAC-CE signaling comprises one of the following: a MAC-CE signaling for activating or updating a TCI state ID of a PDSCH, or a MAC-CE signaling for activating or updating a TCI state ID of a CORESET;
determining, according to a predetermined rule, a frequency domain bandwidth corresponding to a first-type MAC-CE signaling, wherein the predetermined rule comprises that in a case where an RRC signaling configures no frequency domain bandwidth group, the frequency domain bandwidth corresponding to the first-type MAC-CE signaling comprises a frequency domain bandwidth corresponding to a frequency domain bandwidth index carried in the first-type MAC-CE signaling, wherein the first-type MAC-CE signaling comprises one of the following: a MAC-CE signaling for activating or updating a TCI state ID of a PDSCH, or a MAC-CE signaling for activating or updating a TCI state ID of a CORESET;
determining, according to a predetermined rule, a physical uplink control channel (PUCCH) resource corresponding to a first-type MAC-CE signaling for activating or updating PUCCH spatial relationship information, wherein the predetermined rule comprises that in a case where an RRC signaling configures a PUCCH resource group, a PUCCH resource corresponding to the first-type MAC-CE signaling includes a PUCCH resource group where a PUCCH resource corresponding to a PUCCH resource index carried in the first-type MAC-CE signaling is located, wherein the first-type MAC-CE signaling comprises one of the following: a MAC-CE signaling for updating or activating a PUCCH spatial relationship, or a MAC-CE signaling for activating or updating a spatial relationship of a PUCCH resource group; or
determining, according to a predetermined rule, a PUCCH resource corresponding to a first-type MAC-CE signaling for activating or updating PUCCH spatial relationship information, wherein the predetermined rule comprises that in a case where no PUCCH group is configured, the PUCCH resource corresponding to the first-type MAC-CE signaling comprises a PUCCH resource corresponding to a PUCCH resource index carried in the MAC-CE signaling, wherein the first-type MAC-CE signaling comprises one of the following: a MAC-CE signaling for updating or activating a PUCCH spatial relationship, or a MAC-CE signaling for activating or updating a spatial relationship of a PUCCH resource group.

15. The apparatus according to claim 12, wherein the at least one processor is caused to further perform the following:
determining a first-type CORESET according to a CORESET group index and a time domain parameter of a search space associated with a CORESET comprised in a CORESET group; and
determining the beam failure detection reference signal set according to the first-type CORESET,
wherein the first-type CORESET comprises at most A CORESETs, and the beam failure detection reference signal set comprises at most A reference signals, wherein A is determined by N, a number of CORESETs, and reported capacity information.

16. The apparatus according to claim 15, wherein
the first-type CORESET belongs to the CORESET group;
the beam failure detection reference signal set is determined according to a priority of a CORESET, wherein a priority of one CORESET with a search space of shorter period is higher, and the time domain parameter of the search space comprises the period of the search space; and in response to two search spaces corresponding two CORESETs having a same period, a priority of one of the two CORESETs having a higher index is higher; and
the beam failure detection reference signal set is acquired according to a quasi co-location parameter, associated with a spatial Rx parameter, of the first-type CORESET.

17. The apparatus according to claim 12, wherein,
a first-type frequency domain bandwidth group and a second-type frequency domain bandwidth group share a division signaling of a frequency domain bandwidth group; and
the first-type frequency domain bandwidth group and the second-type frequency domain bandwidth group satisfy that first-type frequency domain bandwidths in the first-type frequency domain bandwidth group share a high-layer signaling for activating or updating a transmission configuration indication state identifier (TCI state ID) of a physical downlink shared channel (PDSCH) and second-type frequency domain bandwidths in the second-type frequency domain bandwidth group share a high-layer signaling for activating or updating a TCI state ID of CORESETs with a first CORESET index.

18. The apparatus according to claim 12, wherein the at least one processor is caused to further perform at least one of the following:
respectively performing the following operations according to each of the N sets of beam failure recovery parameters: beam failure detection, beam failure request, and new reference signal indication reporting;
in response to beam failure requests of the N CORESET groups being reported simultaneously, the beam failure requests of the N CORESET groups are reported after combination; or
in response to new reference signal indication reporting of the N CORESET groups being reported simultaneously, the new reference signal indication reporting of the N CORESET groups is reported after combination.

19. A non-transitory computer storage medium storing a computer program, wherein when the computer program is executed by a processor, the following processes are performed:

determining a corresponding relationship between N control resource set (CORESET) groups and N sets of beam failure recovery parameters according to a predetermined rule, wherein
N is a positive integer greater than 1;
each of the N CORESET groups comprises CORESETs, which are associated with a same identifier number, in one bandwidth part (BWP);
the corresponding relationship between the N CORESET groups and the N sets of beam failure recovery parameters comprises: the N CORESET groups correspond to the N sets of beam failure recovery parameters; and each of the N CORESET groups corresponds to one of the N sets of beam failure recovery parameters; and
each of the N sets of beam failure recovery parameters comprises: a beam failure detection reference signal set and a candidate reference signal set.

* * * * *